(12) United States Patent
Watanabe et al.

(10) Patent No.: US 11,119,330 B2
(45) Date of Patent: Sep. 14, 2021

(54) RETICLE, RETICLE UNIT, RIFLE SCOPE, AND OPTICAL APPARATUS

(71) Applicants: NIKON CORPORATION, Tokyo (JP); NIKON VISION CO., LTD, Tokyo (JP)

(72) Inventors: Koichi Watanabe, Mito (JP); Jun Kawakami, Mito (JP); Katsunori Tomita, Machida (JP); Yasuaki Ishikawa, Tokyo (JP); Satoru Okazaki, Mito (JP)

(73) Assignees: NIKON CORPORATION, Tokyo (JP); NIKON VISION CO., LTD., Tokyo (JP)

( * ) Notice: Subject to any disclaimer, the term of this patent is extended or adjusted under 35 U.S.C. 154(b) by 0 days.

(21) Appl. No.: 16/618,385

(22) PCT Filed: May 31, 2018

(86) PCT No.: PCT/JP2018/020925
§ 371 (c)(1),
(2) Date: Dec. 1, 2019

(87) PCT Pub. No.: WO2018/221644
PCT Pub. Date: Dec. 6, 2018

(65) Prior Publication Data
US 2020/0292838 A1    Sep. 17, 2020

(30) Foreign Application Priority Data

Jun. 2, 2017  (JP) ............... JP2017-110350
May 30, 2018  (JP) ............... JP2018-103754

(51) Int. Cl.
*G02B 27/32* (2006.01)
*F41G 1/38* (2006.01)
*G02B 23/00* (2006.01)

(52) U.S. Cl.
CPC ............... *G02B 27/32* (2013.01); *F41G 1/38* (2013.01); *G02B 23/00* (2013.01)

(58) Field of Classification Search
CPC ........... F41G 1/38; G02B 27/32; G02B 27/34; G02B 27/36; G02B 23/00
(Continued)

(56) References Cited

U.S. PATENT DOCUMENTS 1,302,353 A    4/1919  Friedrich
2,420,503 A *  5/1947  Stechbart ............... G02B 23/10
                                                    356/247

(Continued)

FOREIGN PATENT DOCUMENTS

JP    58-132221 A    8/1983
JP    63-183430 A    7/1988
(Continued)

OTHER PUBLICATIONS

International Search Report for PCT Application No. PCT/JP2018/020925, dated Aug. 21, 2018.
(Continued)

*Primary Examiner* — Bret Hayes
(74) *Attorney, Agent, or Firm* — SGPatents PLLC

(57) ABSTRACT

There are provided a reticle, a reticle unit, and an optical apparatus, such as a rifle scope, each having a novel configuration that allows formation of a desired pattern. In a reticle $30A_1$ on which a pattern that serves as an indicator when an object under observation is visually recognized is formed, the pattern is formed of protruding sections 33a and 33b provided on a pattern formation surface 31a of a plate-shaped optical member 31. The protruding sections 33a and 33b are each formed of a plurality of protruding ridges 133 (structural elements) extending in the lengthwise direction of a line that forms the pattern in parallel to the
(Continued)

widthwise direction of the line. The protruding ridges 133 each have an inclining surface 140 inclining with respect to the optical path of an observation optical path, and the inclination angle of the inclining surface with respect to the optical axis Z is so set at an angle that causes light incident via an objective lens to be deflected to exit out of the observation optical path.

22 Claims, 26 Drawing Sheets

(58) Field of Classification Search
USPC .......................................................... 42/122
See application file for complete search history.

(56) References Cited

U.S. PATENT DOCUMENTS

| | | | |
|---|---|---|---|
| 4,374,612 A * | 2/1983 | Matsumura | G02B 27/34 |
| | | | 396/288 |
| 5,053,803 A * | 10/1991 | Suda | G03B 17/20 |
| | | | 396/111 |
| 5,119,124 A * | 6/1992 | Ito | G03B 17/20 |
| | | | 396/147 |
| 5,644,431 A * | 7/1997 | Magee | G02B 3/0031 |
| | | | 359/619 |
| 6,175,455 B1 | 1/2001 | Kato et al. | |
| 7,793,456 B1 | 9/2010 | Lacorte | |
| 7,871,680 B2 * | 1/2011 | Kinoshita | G02B 6/0053 |
| | | | 428/1.3 |
| 8,541,713 B1 | 9/2013 | Dugan et al. | |
| 9,222,753 B2 | 12/2015 | Hornung et al. | |
| 9,442,345 B2 | 9/2016 | Okura et al. | |
| 2002/0086245 A1 * | 7/2002 | Zait | B23K 26/18 |
| | | | 430/321 |
| 2002/0122255 A1 * | 9/2002 | Ogusu | G02B 5/1857 |
| | | | 359/566 |
| 2004/0085631 A1 * | 5/2004 | Mueller | G02B 23/10 |
| | | | 359/407 |
| 2004/0126673 A1 * | 7/2004 | Udagawa | G03F 1/38 |
| | | | 430/5 |
| 2005/0074579 A1 * | 4/2005 | Suzuki | G02B 1/11 |
| | | | 428/141 |
| 2012/0113507 A1 | 5/2012 | Arai | |
| 2013/0004711 A1 * | 1/2013 | Doi | G02B 1/118 |
| | | | 428/141 |
| 2013/0286472 A1 | 10/2013 | Arai et al. | |
| 2014/0007486 A1 * | 1/2014 | Hornung | F41G 1/345 |
| | | | 42/123 |

FOREIGN PATENT DOCUMENTS

| | | |
|---|---|---|
| JP | 05-259020 A | 10/1993 |
| JP | 08-285598 A | 11/1996 |
| JP | 11-160760 A | 6/1999 |
| JP | 2006-99089 A | 4/2006 |
| JP | 2008-180970 A | 8/2008 |
| JP | 2009-174845 A | 8/2009 |
| JP | 2009-175406 A | 8/2009 |
| JP | 2011-017884 A | 1/2011 |
| JP | 2016-081001 A | 5/2016 |
| WO | WO-2012/057010 A1 | 5/2012 |

OTHER PUBLICATIONS

Written Opinion of the International Searching Authority for PCT Application No. PCT/JP2018/020925, dated Aug. 21, 2018.
Extended European Search Report and European Search Opinion dated Mar. 3, 2021, in European Patent Application No. 18810515.9.
Office Action dated Jun. 18, 2021, in Japanese Patent Application No. 2017-110350.

* cited by examiner (a)

(b)

(a)

(b)

(a)

(b)

(a)

(b)

(c)

RETICLE, RETICLE UNIT, RIFLE SCOPE, AND OPTICAL APPARATUS

TECHNICAL FIELD

The present invention relates to a reticle on which a pattern is formed to serve as an indicator when an observer visually recognizes an object under observation, a reticle unit, and an optical apparatus, such as a rifle scope including the reticle or the reticle unit.

BACKGROUND ART

Examples of the optical apparatus including the reticle described above include a rifle scope, a field scope, a surveying apparatus, a telescope, and a microscope. For example, a scope for gunsight (hereinafter referred to as "rifle scope") represented by a rifle scope uses a reticle on which a pattern is formed to have crosshairs for allowing a shooter to aim the rifle at a target, a bullet drop compensation line, a dot, or the combination thereof. Such a reticle is typically formed of a thin substrate made of optical glass and formed by extending and bonding two wires in the form of a cross onto the glass substrate, engraving a glass substrate to form grooves and fixing ink into the grooves, forming crosshairs by using electrocasting, or otherwise processing a glass substrate to block incident light for visual recognition of an image of the pattern (see Patent Literatures 1 and 2, for example). In the configuration having extended wires, however, it is difficult to greatly change the linewidth of the wires in the middle of the wires. In the configuration based on electrocasting, it is difficult to form a pattern that allows an observer to observe an end portion of a line or an entire figure, such as a bullet drop compensation line, a dot, and a symbol, as if it floats in the air.

CITATION LIST

Patent Literature

Patent Literature 1: U.S. Pat. No. 7,793,456
Patent Literature 2: U.S. Pat. No. 1,302,353

SUMMARY OF INVENTION

A first aspect relates to a reticle. A first reticle is a reticle that has a pattern formed thereon, the pattern (reticle pattern 32 in the following embodiments, for example) serving as an indicator when an observer visually recognizes an object under observation, and is suitable for being disposed in an observation optical path between an objective lens and an ocular lens in a position of an image formed by the objective lens. In the reticle, the pattern includes a protruding section and/or a recessed section provided on at least one surface of a plate-shaped optical member, and the protruding section and the recessed section are each formed of a plurality of structural elements. The structural elements each have an inclining surface inclining with respect to an optical axis of the observation optical path, and an inclination angle of the inclining surfaces with respect to the optical axis is set at an angle that causes light incident via the objective lens to be deflected to exit out of the observation optical path.

A second reticle is used for a rifle scope and has a pattern formed thereon, the pattern serving as an indicator when an observer visually recognizes an object under observation, the reticle including the following components: a plate-shaped optical member having two transparent light transmissive surfaces; and a first pattern (linear patterns 32a, 32b or cross pattern 32d in the following embodiments, for example) and a second pattern (ring-shaped pattern 32c in the following embodiments, for example) formed on the light transmissive surfaces. The first and second patterns are each formed of a plurality of structural elements each having an inclining surface inclining with respect to the light transmissive surfaces, and an inclination angle $\alpha/2$ of the inclining surfaces with respect to an optical axis of the rifle scope satisfies $21° \leq \alpha/2 \leq 70°$.

A second aspect relates to a reticle unit. The reticle unit includes the reticle according to the first aspect on which a reflector is further formed, the reflector having a reflection surface that is at least part of a surface that forms any of the structural surfaces and formed on one of surfaces of the optical member, a light source that is disposed in a position facing a side of the reflector and radiates light, and a light collector that is disposed between the light source and the reflector, collects the light radiated from the light source, and guides the collected light to the reflection surface. The light radiated from the light source, collected by the light collector, and reflected off the reflection surface is caused to exit via another surface of the optical member for visual recognition of the light along with an image of the pattern. The term "collect" in the present specification means that divergent light output from the light source is collected into roughly parallel light or convergent light.

A third aspect relates to an optical apparatus, such as a rifle scope, a field scope, a surveying apparatus, and a telescope. The optical apparatus includes an objective lens that forms an image of an object under observation, an ocular lens for observing the image of an object under observation formed by the objective lens, and the reticle according the first aspect or the reticle unit according the second aspect that is disposed in a position of the image formed by the objective lens in an observation optical path between the objective lens and the ocular lens and includes a plate-shaped optical member on which a pattern is formed, the pattern serving as an indicator when an observer visually recognizes the object under observation via the ocular lens.

A fourth aspect relates to a method for manufacturing the reticle according to the first aspect. The manufacturing method includes the steps of plating a die surface with a metal, forming a plurality of minute structures corresponding to the structural elements on the die surface plated with the metal to form a structure corresponding to the protruding section and/or the recessed section, and placing a die having the structure corresponding to the protruding section and/or the recessed section formed therein in a forming machine to form the reticle. The "minute structures corresponding to the structural elements" are reversed structural elements having the reversed recessed/protruding shape of the protruding/recessed structural elements. The same holds true for the "structure corresponding to the protruding section" and the "structure corresponding to the recessed section."

BRIEF DESCRIPTION OF DRAWINGS

FIG. 2(a) is a perspective view of a reticle, and FIG. 2(b) shows the reticle viewed from the side facing a reticle pattern formation surface.

FIGS. 3(a) and 3(b) are schematic cross-sectional views of the reticle taken along planes perpendicular to pattern lines.

FIGS. 6(a) and 6(b) are schematic cross-sectional views of the reticle taken along planes perpendicular to pattern lines.

FIG. 10(a) shows a case where a reticle 30A according to the first embodiment is used, and FIG. 10(b) shows a case where a reticle 30B according to the second embodiment is used.

DESCRIPTION OF EMBODIMENT

Figure 1:
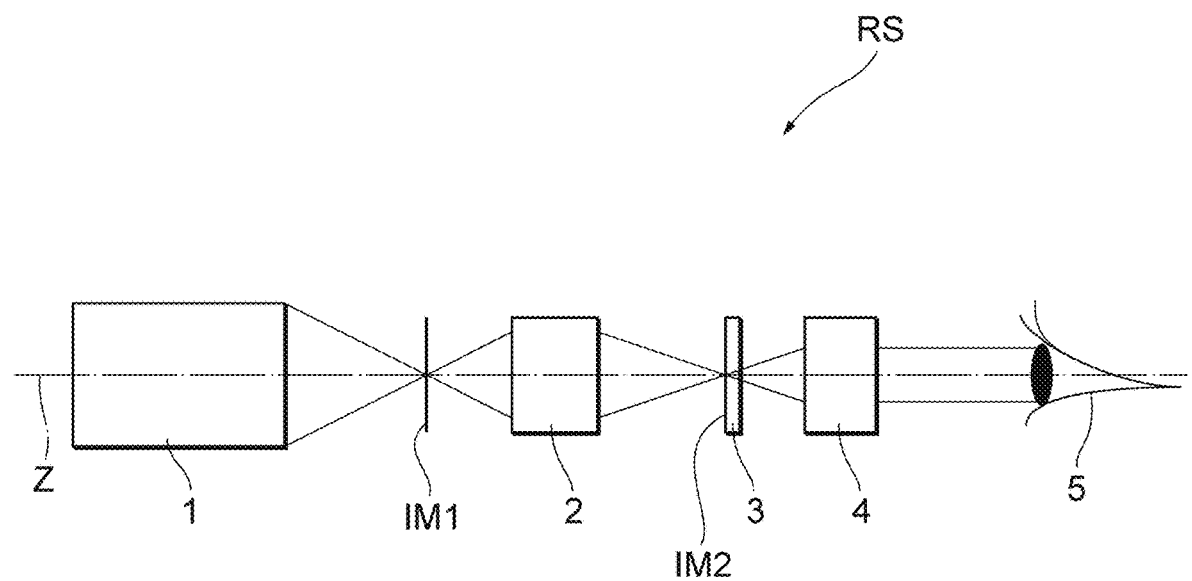
FIG. 1 is a descriptive diagram showing a schematic configuration of a rifle scope that is an example of an optical apparatus.
Figure 1:
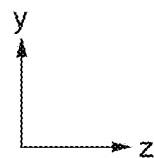
Figure 2:
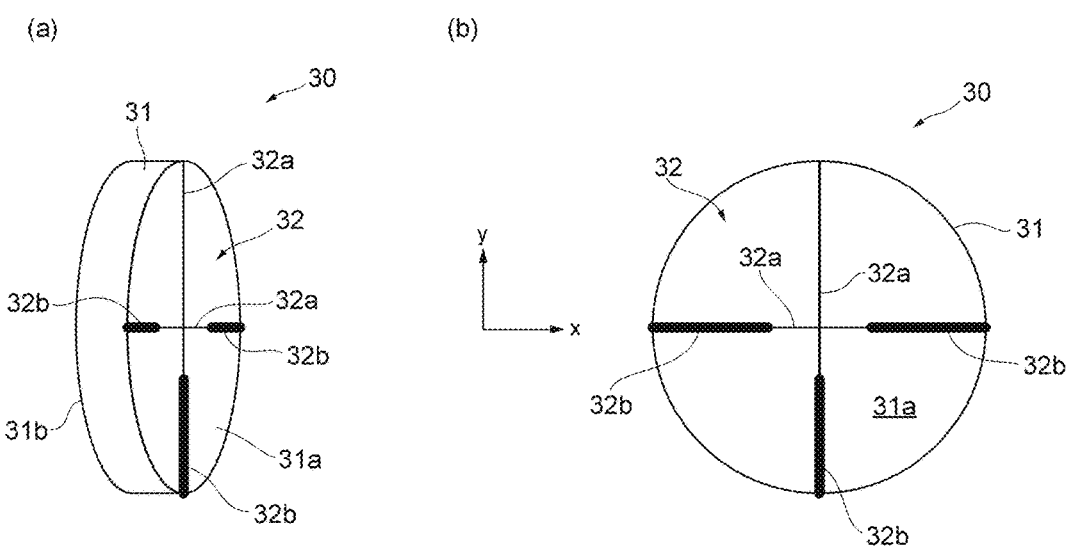
FIG. 2 is a descriptive diagram for describing a reticle pattern.

A form for implementing the present invention will be described below with reference to the drawings. As an example of an optical apparatus using a reticle according to the present embodiment, FIG. 1 shows a schematic configuration of a rifle scope RS, and FIG. 2 shows an example of the configuration of the reticle used in the rifle scope RS. An overview of the rifle scope RS will first be described with reference to these figures. The rifle scope RS includes an objective lens 1, an erecting lens 2, a reticle unit 3 including a reticle 30, which will be described later, and an ocular lens 4 sequentially arranged from the side facing an object under observation. The objective lens 1, the erecting lens 2, and the ocular lens 4 can each be formed of a single lens or a plurality of lenses (lens group). In the present specification, the direction of the optical axis of the rifle scope RS (direction of optical axis of observation optical path) corresponds to an axis z, as indicated by the coordinate axes shown in FIGS. 1 and 2. Two directions perpendicular to each other in a plane that intersects the axis z at right angles correspond to axes x and y, with the axis x corresponding to the direction perpendicular to the plane of view of FIG. 1, and the axis y corresponding to the direction along the plane of view.

The objective lens 1 focuses light from the side facing the object under observation to form an inverted image (primary image) IM1 of the object under observation, and the erecting lens 2 converts the primary image IM1, which is the inverted image formed by the objective lens 1, into a secondary image IM2, which is an erect image. The reticle 30 is so disposed in the position conjugate with the primary image IM1 formed by the objective lens 1 as to roughly coincide with the secondary image IM2. The reticle 30 may instead be disposed to roughly coincide with the primary image IM1. That is, the reticle 30 is disposed in the position of the primary or secondary image formed by the objective lens 1 in the observation optical path between the objective lens 1 and the ocular lens 4.

The reticle 30 is primarily formed of a transparent, disc-shaped optical member 31, which transmits light having desired wavelengths including the wavelengths in the visible region, and a reticle pattern 32, which serves as an indicator when a shooter aims the rifle at a mark, is formed on one surface of the optical member 31. There are a variety of forms of a reticle pattern, and the present embodiment shows a configuration in which the reticle pattern 32 is formed to be crosshairs extending in the axis-x and axis-y directions from the center of the optical member 31 toward the periphery thereof. In the configuration shown by way of example, a pattern line extending in the axis-x direction and a pattern line extending downward from the center in the axis-y direction are each formed of a thin pattern line (small linewidth) in the vicinity of the center and a thick pattern line (large linewidth) in the periphery, and a pattern line extending upward from the center in the axis-y direction is formed of a thin pattern line. The thin pattern lines are each called a pattern line 32a, and the thick pattern lines are each called a pattern line 32b. The pattern lines 32a and 32b are each a linear partial pattern that forms the reticle pattern 32. In the following description, the thin pattern lines 32a are each also called a thin linear pattern, and the thick pattern lines 32b are each also called a thick linear pattern. Specific linewidths of the pattern lines 32a and 32b vary depending on the application and function of the reticle, preference of an observer, and other factors. In the case of a reticle for rifle scope, the linewidth of the thin pattern lines 32a is set to range from about 5 to 50 µm, and the linewidth of the thick pattern lines 32b is set to range from about 50 to 250 µm.

The reticle 30 is so disposed that the intersection of the pattern lines extending in the axis-x and axis-y directions roughly coincides with the optical axis (optical axis of observation optical path) Z of the rifle scope RS. The reticle 30 is so disposed that a surface 31a, on which the reticle pattern 32 is formed (hereinafter referred to as "pattern formation surface"), roughly coincides with the secondary image IM2 formed by the erecting lens 2 (or primary image IM1 formed by objective lens 1), and the pattern formation surface 31a substantially coincides with the object-side focal plane of the ocular lens 4. Therefore, when the observer observes the object under observation through the reticle 30 from the side facing the ocular lens 4, the secondary image IM2 (or primary image IM1) of the object under observation is superimposed on an image of the reticle pattern 32, and the superimposed image is visually recognized with an eye 5 of the observer through the ocular lens 4. The observer can thus precisely align the optical axis Z of the rifle scope RS with the object under observation (target), which is a mark, to aim the rifle with the target.

In the reticle 30, the reticle pattern 32 is formed of protruding sections and/or recessed sections provided at least on the pattern formation surface 31a of the optical member 31, which is a base or a substrate of the reticle 30. The protruding sections and the recessed sections are each formed of a plurality of structural elements, and the structural elements each have a refraction surface that refracts the light incident via the objective lens 1. The inclination of the refraction surface of each of the plurality of structural elements is so set that the refraction surface refracts the light incident via the objective lens 1 and causes the refracted light to exit out of the observation optical path, so that the observer visually recognizes an image of the pattern 32 in the form of a dark pattern that is the image of the pattern 32 superimposed on the image of the object under observation.

First Embodiment

In a reticle 30A according to a first embodiment, the protruding sections are formed of a plurality of protruding ridges extending in the lengthwise direction of the lines that form the reticle pattern 32 in parallel to the width direction of the lines, and the recessed sections are formed of a plurality of grooves extending in the lengthwise direction of the lines that form the reticle pattern 32 in parallel to the width direction of the lines. That is, in the present embodiment, the plurality of structural elements that form each of the protruding sections are a plurality of protruding ridges parallel to each other, and the plurality of structural elements that form each of the recessed sections are a plurality of grooves parallel to each other. When an object under observation is observed through the reticle 30, the light incident from the side facing the object under observation on the reticle 30 is deflected by the protruding sections and/or the recessed sections, and the deflected light allows visual recognition of an image of the reticle pattern 32.

Figure 3:
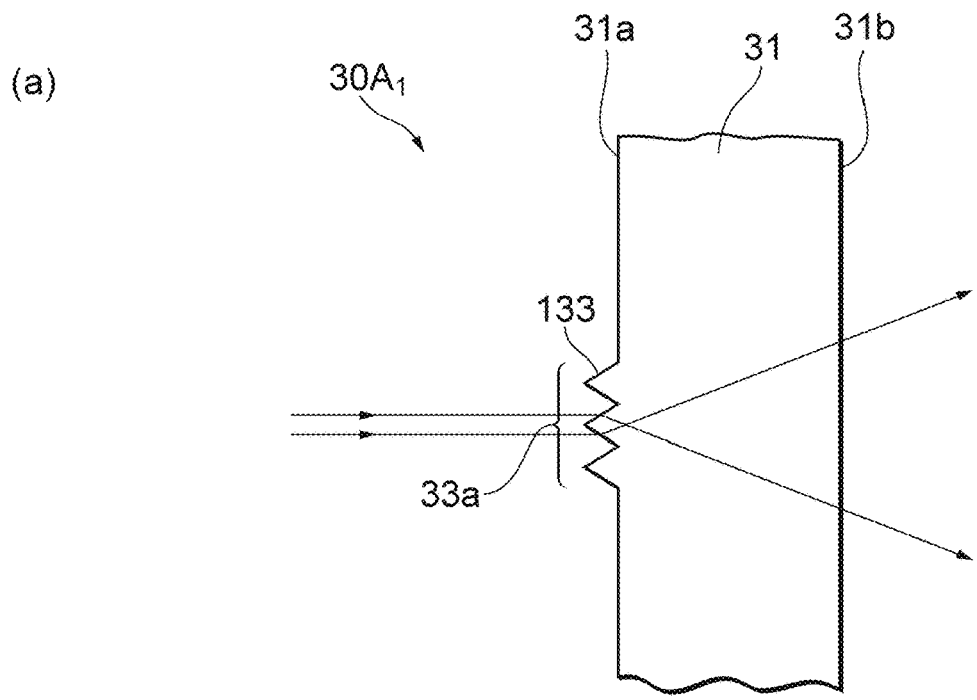
FIG. 3 is a descriptive diagram for describing a reticle according to a first configuration form in a first embodiment.
Figure 3:
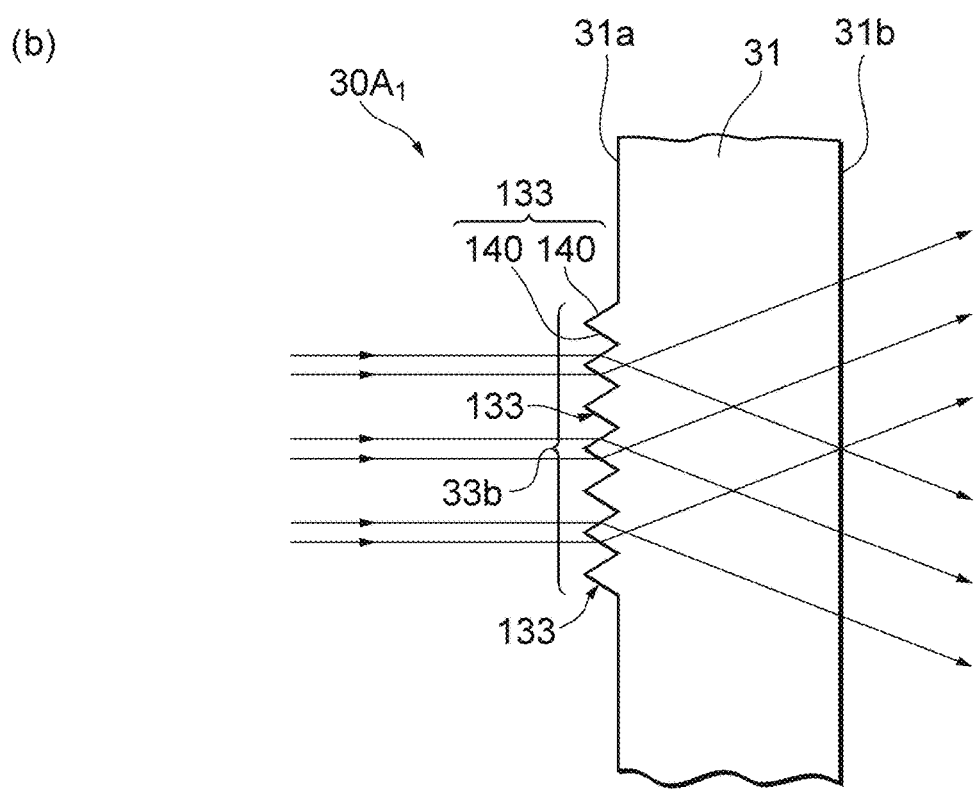
Figure 4:
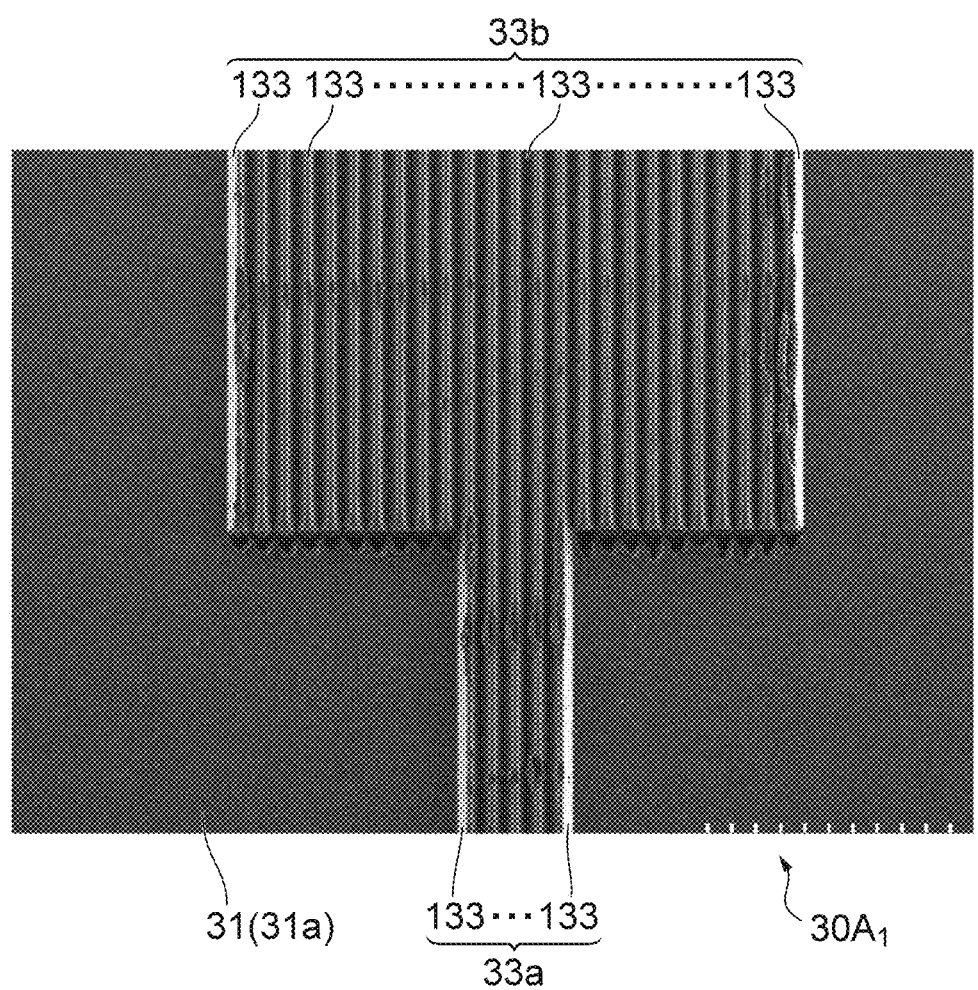
FIG. 4 is a micrograph of an enlarged portion of structural elements that form the pattern lines.
Figure 5:
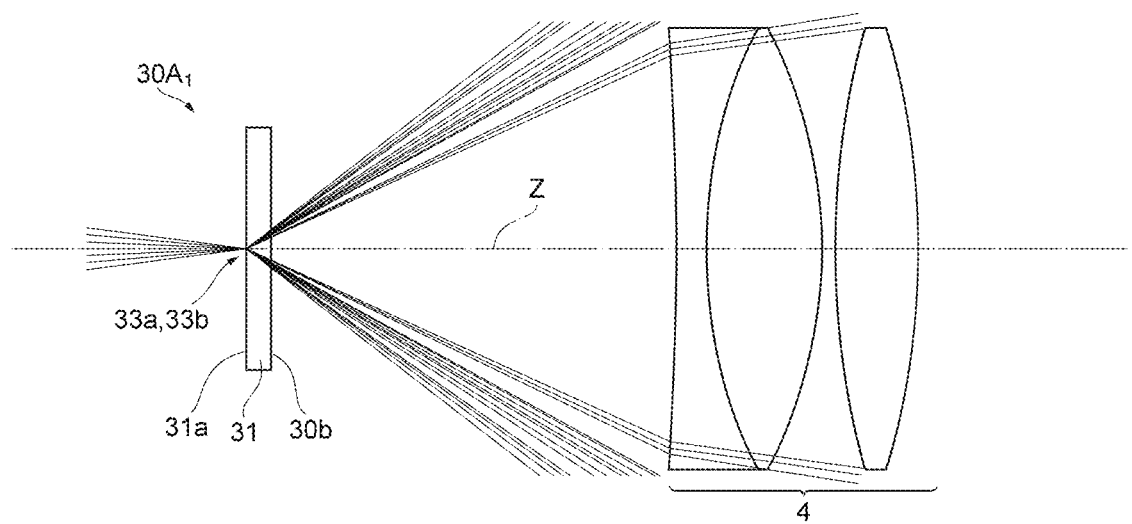
FIG. 5 is a descriptive diagram for describing the state in which light incident from the side facing an object under observation on protruding sections of the reticle exits out of the reticle.

The thus characterized reticle 30A will be described with reference to FIGS. 3 to 5, which show a reticle $30A_1$ according to a first configuration form that is part of the present embodiment. FIGS. 3(a) and 3(b) are schematic cross-sectional views of the reticle $30A_1$ taken along planes that intersect the pattern lines 32a and 32b at right angles. FIG. 4 is a micrograph of an enlarged portion of the pattern lines 32a and 32b. FIG. 5 is a descriptive diagram for describing the state in which light incident from the side facing an object under observation on the protruding sections of the reticle $30A_1$ exits out of the reticle $30A_1$.

In the reticle $30A_1$ according to the first configuration form, the pattern lines 32a and 32b of the reticle pattern 32 are formed of protruding sections 33a and 33b provided on the pattern formation surface 31a of the optical member 31. The protruding section 33a corresponds to the small-linewidth pattern line (thin linear pattern) 32a, and the protruding section 33b corresponds to the large-linewidth pattern line (thick linear pattern) 32b. The protruding sections 33a and 33b are each formed of a plurality of minute protruding ridges 133, 133, 133 . . . extending in the lengthwise direction of the pattern lines in parallel to the width direction of the pattern lines. In other words, the protruding sections 33a and 33b are each formed of a plurality of protruding ridges 133 each having a width smaller than the linewidth of the pattern lines. The protruding ridges 133 are each formed to extend in the lengthwise direction of the pattern lines with the cross-sectional shape perpendicular to the direction in which the pattern lines extend having a triangular-prism-like shape that protrudes from the pattern formation surface 31a toward the object under observation.

The inclination angles of two inclining surfaces 140, 140, which form each of the protruding ridges 133, with respect to the optical axis Z are each so set that the angles of the light that is incident on, refracted at, and deflected by the inclining surface and exits via the other surface of the optical member that is the surface facing the pattern formation surface 31a (hereinafter referred to as "opposite surface") 31b are greater than the angles of the light that passes through the ocular lens 4, which is provided on the downstream of the reticle $30A_1$. In plain words, the inclination angles are so set that the light that is deflected by the protruding ridges 133, 133, 133 . . . and exits out of the reticle $30A_1$ does not pass through the ocular lens 4 or enter the eye 5 of the observer. The two inclining surfaces 140, 140 of each of the protruding ridges 133 form refraction surfaces that refract the light incident thereon.

The protruding sections 33a and 33b can each be formed of the protruding ridges 133 the number of which is set in accordance with the linewidth of the corresponding pattern line. That is, the protruding section 33a, which forms the thin linear pattern (small-linewidth pattern line) 32a, can be formed of a smaller number of protruding ridges 133, and the protruding section 33b, which forms the thick linear pattern (large-linewidth pattern line) 32b, can be formed of a larger number of protruding ridges 133. In the example of the configuration of the linear patterns shown in FIG. 4, the protruding section 33a of the thin linear pattern 32a having a small linewidth w is formed of 5 protruding ridges 133, and the protruding section 33b of the thick linear pattern 32b having a large linewidth 5w is formed of 25 protruding ridges 133. The width of each of the protruding ridges 133 in the present configuration example is about 10 µm.

In the rifle scope RS including the thus configured reticle 30A$_1$, the light incident from the side facing the object under observation (left in FIG. 3) on the pattern formation surface 31a is so refracted at the inclining surfaces 140 of the protruding ridges 133, 133, 133 . . . , as to be deflected in the direction away from the optical axis Z of the rifle scope RS and exits via the opposite surface 31b of the optical member. In this process, since the exiting angles at which the light exits via the opposite surface 31b of the optical member are greater than exiting angles that allow the light to pass through the ocular lens 4, the light does not enter the eye 5 of the observer via the ocular lens 4. The light that is refracted at the inclining surfaces 140 and exits via the opposite surface 31b (referred to as "deflected light" in convenience) is, for example as shown in FIG. 5, absorbed by the inner circumferential surface of a lens barrel that holds the reticle 30A$_1$, the ocular lens 4, and other components. The observer who looks at the object under observation, which is a mark, from the side facing the ocular lens 4 does not see the light from the portions where the protruding sections 33a and 33b are provided but visually recognizes the linear patterns 32a and 32b as dark lines and clearly observes the image of the reticle pattern 32.

In the reticle 30A$_1$ according to the present embodiment, one pattern line is formed of a plurality of protruding ridges 133 according to the linewidth of the pattern line. The height of the protruding sections that protrude from the pattern formation surface 31a can therefore be greatly reduced, as compared with a case where the protruding sections 33a and 33b are each formed of a single protruding ridge. Therefore, the reticle can be configured to have a small thickness, and damage of the protruding sections 33a and 33b can be suppressed, whereby a reticle that is readily handled when stored, assembled, and otherwise processed can be provided. Further, a uniform contrast reticle pattern irrespective of the linewidths of the pattern lines 32a and 32b can be produced by employing a configuration in which the pattern lines 32a and 32b are each formed of the protruding ridges 133 the number of which is proportional to the linewidth of the pattern line (by forming the protruding ridges at the same density per unit linewidth).

Figure 6:
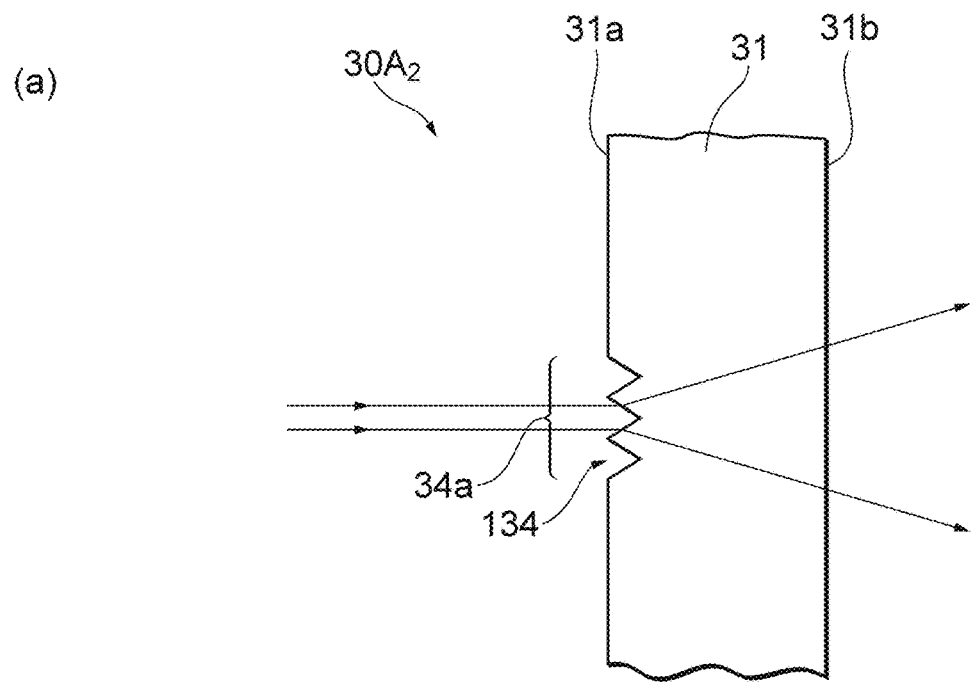
FIG. 6 is a descriptive diagram for describing a reticle according to a second configuration form in the first embodiment.
Figure 6:
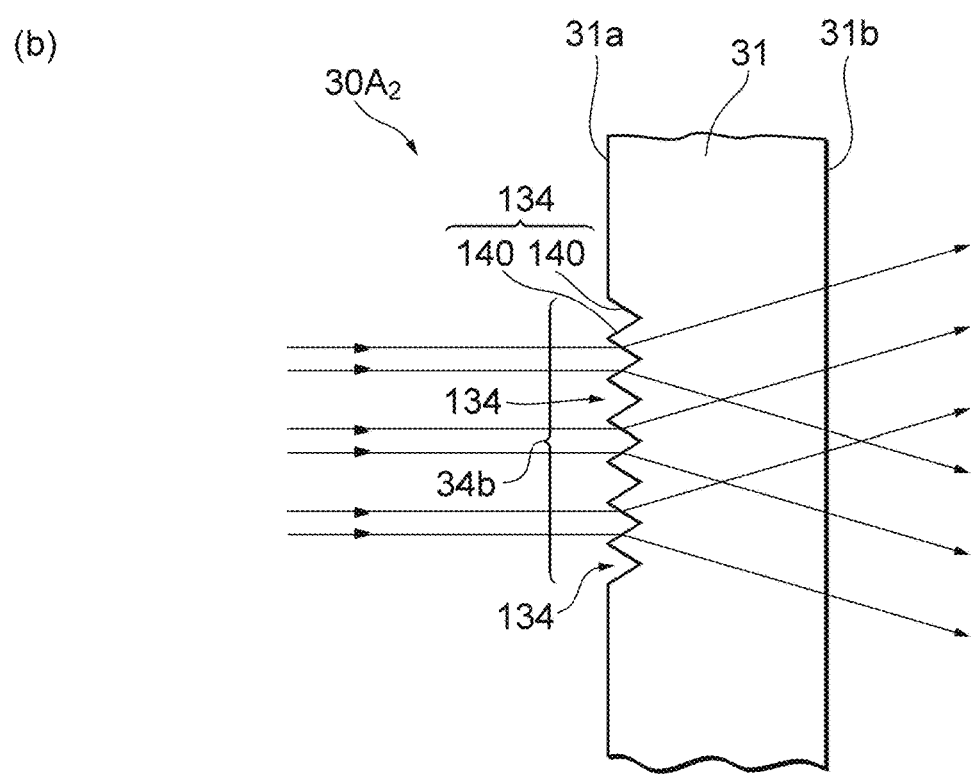

A reticle 30A$_2$ according to a second configuration form that is part of the present embodiment will be described. The reticle 30A$_2$ according to the present configuration form has a configuration form in which the protruding ridges in the reticle 30A$_1$ according to the first configuration form are replaced with V grooves (V-letter-shaped grooves), that is, the structural elements provided on the pattern formation surface 31a are changed from the protruding ridges to the V grooves. FIGS. 6(a) and 6(b) correspond to the FIGS. 3(a) and 3(b) and are each a schematic cross-sectional view of the reticle 30A$_2$ taken along planes that intersect the pattern lines 32a and 32b at right angles.

In the reticle 30A$_2$, the pattern lines 32a and 32b of the reticle pattern 32 are formed of recessed sections 34a and 34b formed in the pattern formation surface 31a of the optical member. The recessed section 34a corresponds to the thin linear pattern (small-linewidth pattern line) 32a, and the recessed section 34b corresponds to the thick linear pattern (large-linewidth pattern line) 32b. The recessed sections 34a and 34b are each formed of a plurality of minute V grooves 134, 134, 134 . . . extending in the lengthwise direction of the pattern lines in parallel to the width direction of the pattern lines. That is, the recessed sections 34a and 34b are each formed of a plurality of V grooves 134 each having a width smaller than the linewidth of the pattern lines. The V grooves 134 are each formed to extend in the lengthwise direction of the pattern lines with the cross-sectional shape perpendicular to the direction in which the pattern lines extend having a V-letter-like shape that opens toward the pattern formation surface 31a.

The inclination angles of two inclining surfaces (refraction surfaces) 140, 140, which form each of the V grooves 134, with respect to the optical axis Z are each so set that the angles of at least part of the light that is incident on, refracted at, and deflected by the inclining surface and exits via the opposite surface 31b are greater than the angles of the light that passes through the ocular lens 4, which is provided on the downstream of the reticle. In plain words, the inclination angles are so set that the light that is deflected by the V grooves 134, 134, 134 . . . and exits out of the reticle 30A$_1$ does not pass through the ocular lens 4 or enter the eye 5 of the observer.

The recessed sections 34a and 34b can each be formed of the V grooves 134 the number of which is set in accordance with the linewidth of the corresponding linear pattern. That is, the recessed section 34a, which forms the thin linear pattern (small-linewidth pattern line) 32a, can be formed of a smaller number of V grooves 134, and the recessed section 34b, which forms the thick linear pattern (large-linewidth pattern line) 32b, can be formed of a larger number of V grooves 134. For example, the recessed section 34a of the thin linear pattern 32a having the small linewidth w is formed of 3 V grooves 134, and the recessed section 34b of the thick linear pattern 32b having a large linewidth 4w is formed of 12 V grooves 134.

In the rifle scope RS including the thus configured reticle 30A$_2$, the light incident from the side facing the object under observation on the pattern formation surface 31a is so refracted at the inclining surfaces 140 of the V grooves 134, 134, 134 . . . , as to be deflected in the direction away from the optical axis Z of the rifle scope and exits via the opposite surface 31b of the optical member. In this process, since the exiting angles at which the deflected light exits via the opposite surface 31b of the optical member are greater than exiting angles that allow the light to pass through the ocular lens 4, the light does not enter the eye 5 of the observer via the ocular lens 4. The observer who looks at the object under observation, which is a mark, from the side facing the ocular lens 4 does not see the light from the portions where the recessed sections 34a and 34b are provided but visually recognizes the linear patterns 32a and 32b as dark lines and clearly observes the image of the reticle pattern 32.

In the reticle 30A$_2$, one pattern line is formed of a plurality of V grooves 134 according to the linewidth of the pattern line. The depth of the recessed sections can therefore be greatly reduced, as compared with a case where the recessed sections are each formed of a single V groove. A reticle having a reduced thickness and improved resistance to impact and external force applied when a bullet is shot can therefore be provided. Further, a uniform contrast reticle pattern irrespective of the linewidths of the pattern lines $32a$ and $32b$ can be produced by employing a configuration in which the pattern lines $32a$ and $32b$ are each formed of the V grooves 134 the number of which is proportional to the linewidth of the pattern line (by forming the V grooves at the same density per unit linewidth).

Figure 7:
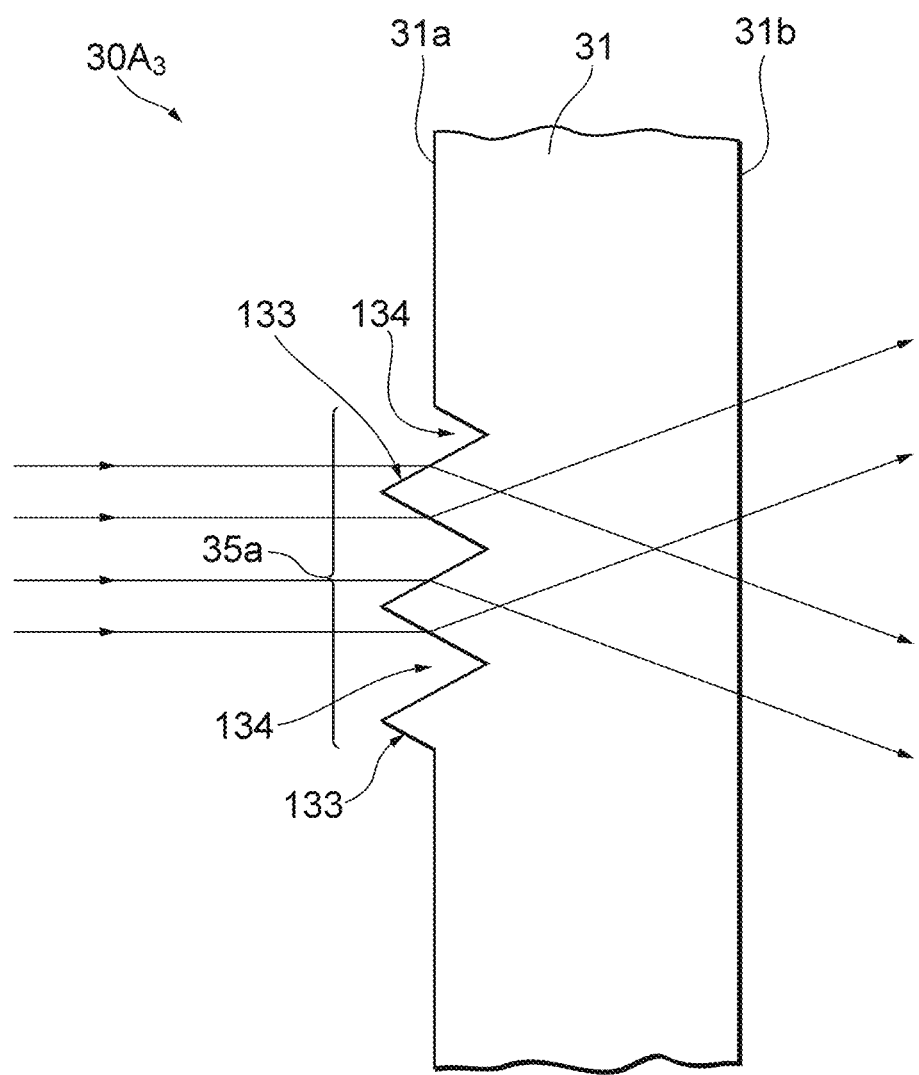
FIG. 7 is a descriptive diagram for describing a reticle according to a third configuration form in the first embodiment and is a schematic cross-sectional view of the reticle taken along a plane perpendicular to a pattern line.

In a reticle $30A_3$ according to a third configuration form that is part of the present embodiment, the pattern lines $32a$ and $32b$ are formed of protruding/recessed sections $35a$ and $35b$ (protruding/recessed section $35b$ is not shown) formed in the pattern formation surface $31a$ of the optical member. FIG. 7 shows a schematic cross-sectional view of the pattern line $32a$ corresponding to FIGS. $3(a)$ and $6(a)$. The protruding/recessed section $35a$ has a complex configuration in which a protruding ridge 133, which protrudes from the pattern formation surface $31a$ toward the object under observation, and a V groove 134, which opens toward the pattern formation surface $31a$, are alternately connected to each other. That is, the protruding/recessed section $35a$ (and $35b$) is so configured that the protruding ridge 133 and the V groove 134, the width of each of which is smaller than the linewidth of the linear patterns, are alternately provided. In the thus configured reticle $30A_3$, one pattern line is formed of a structure in which a plurality of protruding ridges 133 and V grooves 134 according to the linewidth of the pattern line are connected to each other.

Therefore, the height of the protruding ridges that protrude from the pattern formation surface $31a$ can be greatly reduced and the depth of the V grooves that are recessed from the pattern formation surface $31a$ can be greatly reduced, as compared with a case where the protruding/recessed sections are each formed of a single protruding ridge or V groove or a set of a protruding ridge and a V groove. The reticle can therefore be configured to have a small thickness. Further, a reticle that is readily handled when stored, assembled, and otherwise processed with damage of the protruding ridges suppressed and has increased resistance to impact and external force applied when a bullet is shot can be provided. Moreover, a uniform contrast reticle pattern irrespective of the linewidths of the linear patterns $32a$ and $32b$ can be produced by employing a configuration in which the linear patterns $32a$ and $32b$ are each formed of the protruding ridges 133 and the V grooves 134 the number of each of which is proportional to the linewidth of the linear pattern.

The inclination angle of the inclining surfaces (refraction surfaces) 140 of each of the protruding ridges 133 with respect to the optical axis Z of the rifle scope RS and the inclination angle of the inclining surfaces 140 of each of the V grooves 134 with respect to the optical axis Z are set in the same manner as in the configuration forms described previously, and are each so set that the deflected light having exited out of the reticle $30A_3$ does not pass through the ocular lens 4 or enter the eye 5 of the observer. The numbers of protruding ridges 133 and the V grooves 134, which form each of the protruding/recessed sections $35a$ and $35b$, can be set in accordance with the linewidth of the pattern line, that is, the numbers of protruding ridges 133 and the V grooves 134 of the protruding/recessed section $35a$, which forms the thin linear pattern $32a$, is set to be small, and the numbers of protruding ridges 133 and the V grooves 134 of the protruding/recessed section $35b$, which forms the thick linear pattern $32b$, is set to be large.

In the thus configured reticle $30A_3$, the light incident from the side facing the object under observation (left in FIG. 3) on the pattern formation surface $31a$ is so refracted at the inclining surfaces 140 of each of the protruding ridges 133 and the inclining surfaces 140 of each of the V grooves 134 as to be deflected in directions away from the optical axis Z of the rifle scope and exits out of the reticle $30A_3$. Since the exiting angles at which the deflected light exits out of the reticle $30A_3$ are greater than exiting angles that allow the light to pass through the ocular lens 4, the light does not enter the eye 5 of the observer via the ocular lens 4 but is absorbed, for example, by the inner circumferential surface of the lens barrel that holds the reticle $30A_3$, the ocular lens 4, and other components. The observer therefore does not see the light from the portions where the protruding/recessed sections $35a$ and $35b$ are provided but visually recognizes the linear patterns $32a$ and $32b$ as dark lines and clearly observes the image of the reticle pattern 32.

In the reticles 30A ($30A_1$, $30A_2$, and $30A_3$) described above, the reticle pattern 32 is formed of the protruding sections and/or the recessed sections provided on the pattern formation surface $31a$ of the optical member. The protruding sections $33a$ and $33b$ are each formed of a plurality of protruding ridges 133 extending in the lengthwise direction of the lines that form the reticle pattern 32 in parallel to the width direction of the lines, and the recessed sections $34a$ and $34b$ are each formed of a plurality of V grooves 134 extending in the lengthwise direction of the lines that form the reticle pattern 32 in parallel to the width direction of the lines. The protruding/recessed sections $35a$ and $35b$ are each formed of the combination of a plurality of protruding ridges 133 and V grooves 134 extending in the lengthwise direction of the lines that form the reticle pattern 32 in parallel to the width direction of the lines.

Therefore, in the reticle $30A_1$, in which the protruding sections are each formed of a plurality of protruding ridges, the height of the protruding sections that protrude from the pattern formation surface $31a$ can be greatly reduced. A reticle that has a reduced thickness and is readily handled with damage of the protruding sections suppressed can therefore be provided. In the reticle $30A_2$, in which the recessed sections are each formed of a plurality of V grooves, the depth of the recessed sections can be greatly reduced. A reticle that has a reduced thickness and improved resistance to impact and external force applied when a bullet is shot can therefore be provided. In the reticle $30A_3$, in which the protruding/recessed sections each have a structure that is the combination of protruding ridges and V grooves, the height of the protruding ridges that protrude from the pattern formation surface $31a$ can be greatly reduced, and the depth of the V grooves that are recessed from the pattern formation surface $31a$ can be greatly reduced. A reticle that has a reduced thickness, is readily handled when stored, assembled, and otherwise processed with damage of the protruding ridges suppressed, and has improved resistance to impact and external force applied when a bullet is shot can therefore be provided.

Further, in the reticles 30A according to the present embodiment, changing the number of protruding ridges, the V grooves, and other components that form each of the pattern lines as appropriate allows a pattern line having a desired linewidth to be readily formed. As a result, a plurality of types of reticle having the same basic configuration of the reticle pattern but having different linewidths of the pattern lines that form the reticle pattern and different combinations thereof can be readily configured with no change in the plate thickness and other factors of the optical member 31. Further, a uniform contrast reticle pattern can be produced with bright/dark unevenness of the pattern suppressed, as compared with the case where the protruding sections, the recessed sections, and other portions are each formed, for example, of a single protruding ridge or V groove. The inclining surfaces 140 are each formed of a flat surface by way of example, and the inclining surfaces may each instead be a curved surface, a parabolic surface, or any other surface.

The inclination angle of the inclining surfaces (refraction surfaces) 140 that is so set that the light deflected by the inclining surfaces 140 does not enter the eye 5 of the observer will next be described with reference to the reticle 30A$_1$ out of the thus configured reticles 30A described above.

Figure 8:
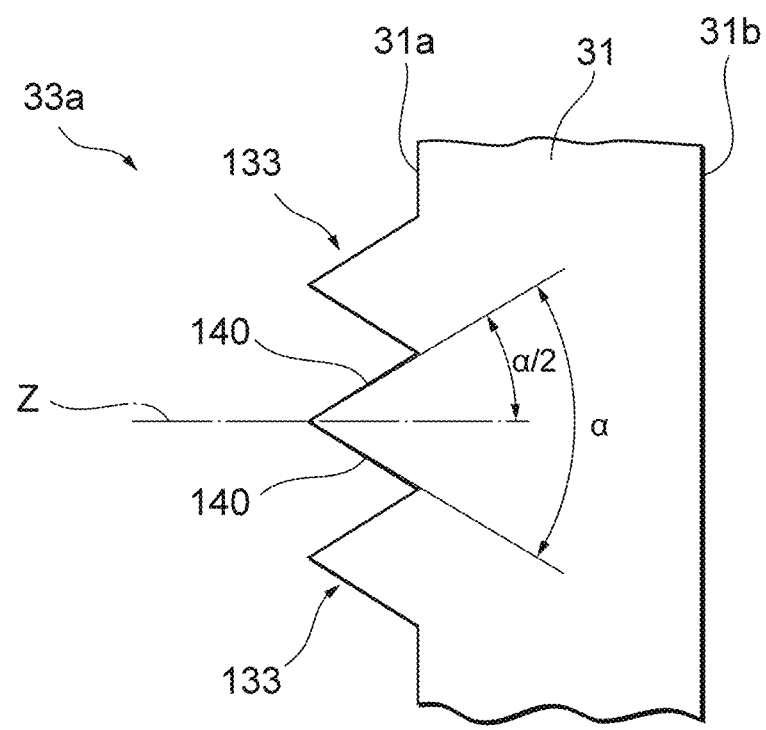
FIG. 8 is a descriptive diagram for describing the inclination angle of inclining surfaces of each structural element.

Let $\alpha$ be the vertex angle of each of the protruding ridges 133 on the reticle 30A$_1$ and $\alpha/2$ be the inclination angle of each of the inclining surfaces 140 with respect to the optical axis Z of the rifle scope RS, as shown in FIG. 8. Under the definitions described above, the light incident on any of the inclining surfaces 140 is refracted in a direction closer to the optical axis Z as the inclination angle $\alpha/2$ is greater whereas in a direction farther from the optical axis Z as the inclination angle $\alpha/2$ is smaller. Therefore, to prevent the light incident on and refracted at the inclining surface 140 from entering the ocular lens 4, it is basically preferable to set the inclination angle $\alpha/2$ of the inclining surface 140 is smaller than or equal to a predetermined angle. The predetermined angle described above from this point of view (called "first predetermined angle" for convenience) $\alpha_1/2$ can be determined based primarily on a light collection angle $\theta$ of the objective lens 1, a refractive index n of the base material (optical member 31) of the reticle 30A$_1$, and an aperture (light flux capturing angle) V of the ocular lens 4.

In the case of a rifle scope, the light collection angle $\theta$ of the objective lens 1 ranges from about 10 to 30°, the refractive index n of the reticle base material appropriate for injection molding ranges from about 1.46 to 1.53, and the light flux capturing angle V of the ocular lens 4 ranges from about 18 to 26°. The first predetermined angle $\alpha_1/2$ described above is therefore roughly specified by the light flux capturing angle V of the ocular lens 4. The first predetermined angle $\alpha_1/2$ ranges from 54 to 58° in a case where an optical system using an ocular lens 4 having a light flux capturing angle V of 18°, and the first predetermined angle $\alpha_1/2$ ranges from 42 to 47° in a case where an optical system using an ocular lens 4 having a light flux capturing angle V of 26°. The same holds true for the case where the protruding ridges 133 are replaced with the V grooves 134.

Further, in a case where the base material of the reticle is suitable, for example, for glass molding and injection molding, the refractive index n of the base material of the reticle ranges from about 1.43 to 1.8. In the case where such a base material is used, the first predetermined angle $\alpha_1/2$ described above ranges from 52 to 70° in the case where an optical system using an ocular lens 4 having a light flux capturing angle V of 18°, and the first predetermined angle $\alpha_1/2$ ranges from 39 to 62° in the case where an optical system using an ocular lens 4 having a light flux capturing angle V of 26°. The same holds true for the case where the protruding ridges 133 are replaced with the V grooves 134.

On the other hand, when the inclination angle $\alpha/2$ of each of the inclining surfaces 140 decreases, the inclination angle of the light incident on and refracted at the inclining surface 140 with respect to the optical axis Z increases, and the light incident on and refracted at one of the inclining surfaces (inclining surface having inclination angle $\alpha/2$) 140 is incident on the other inclining surface (inclining surface having inclination angle $-\alpha/2$) 140. The light described above, which is incident on the other inclining surface at a large angle of incidence, is totally reflected off the other inclining surface and may form what is called stray light and enter the ocular lens 4. Therefore, to suppress occurrence of the stray light, it is preferable to set the inclination angle $\alpha/2$ of each of the inclining surfaces 140 to be greater than or equal to the predetermined angle. The predetermined angle described above from this point of view (called "second predetermined angle" for convenience) $\alpha_1/2$ can be determined based primarily on the light collection angle $\theta$ of the objective lens 1, the refractive index n of the base material of the reticle 30A$_1$, and the light flux capturing angle V of the ocular lens 4.

In a case where the base material is suitable for injection molding, and an optical system using an objective lens 1 having a light collection angle $\theta$ of 10° is used, the second predetermined angle $\alpha_2/2$ ranges from 21 to 22° when the light flux capturing angle V of the ocular lens 4 is 18°, and the second predetermined angle $\alpha_2/2$ ranges from 23 to 24° when the light flux capturing angle V is 26°. In a case where an optical system using an objective lens 1 having a light collection angle $\theta$ of 30° is used, the second predetermined angle $\alpha_2/2$ ranges from 23 to 24° when the light flux capturing angle V of the ocular lens 4 is 18°, and the second predetermined angle $\alpha_2/2$ ranges from 25 to 26° when the light flux capturing angle V is 26°. The same holds true for the case where the protruding ridges 133 are replaced with the V grooves 134.

Further, in a case where the base material is suitable, for example, for glass molding and injection molding, and an optical system using an objective lens 1 having the light collection angle $\theta$ of 10° is used, the second predetermined angle $\alpha_2/2$ ranges from 21 to 24° when the light flux capturing angle V of the ocular lens 4 is 18°, and the second predetermined angle $\alpha_2/2$ ranges from 23 to 25° when the light flux capturing angle V is 26°. In the case where an optical system using an objective lens 1 having the light collection angle $\theta$ of 30° is used, the second predetermined angle $\alpha_2/2$ ranges from 23 to 25° when the light flux capturing angle V of the ocular lens 4 is 18°, and the second predetermined angle $\alpha_2/2$ ranges from 25 to 27° when the light flux capturing angle V is 26°. The same holds true for the case where the protruding ridges 133 are replaced with the V grooves 134.

Based on the above description, the inclination angle $\alpha/2$ of each of the inclining surfaces 140 of each of the protruding ridges 133 (V grooves 134) is preferably smaller than or equal to the first predetermined angle $\alpha_1/2$ and further preferably set to fall within an angular range greater than or equal to the second predetermined angle $\alpha_2/2$ ($\alpha_2/2 \leq \alpha/2 \leq \alpha_1/2$). Specifically, setting the inclination angle $\alpha/2$ of each of the inclining surfaces 140 so as to satisfy $21° \leq \alpha/2 \leq 70°$ allows clear visual recognition of the pattern lines 32a and 32b through a rifle scope using a reticle made of a relatively high-refractive-index base material suitable for glass molding and injection molding. Further, setting the inclination angle $\alpha/2$ of each of the inclining surfaces 140 so as to satisfy $21° \leq \alpha/2 \leq 58°$ allows clear visual recognition of the pattern lines 32a and 32b through a rifle scope using a reticle made of a base material suitable for injection molding.

Setting the inclination angle $\alpha/2$ of each of the inclining surfaces 140 so as to satisfy $26° \leq \alpha/2 \leq 42°$ allows clear visual recognition of the pattern lines 32a and 32b at high contrast through a rifle scope using a reticle made of a base material suitable for injection molding and a reticle made of any of nearly all base materials suitable for glass molding and injection molding. Further, setting the inclination angle $\alpha/2$ of each of the inclining surfaces 140 so as to satisfy $27° \leq \alpha/2 \leq 39°$ allows clear visual recognition of the pattern lines 32a and 32b at high contrast through any of nearly all rifle scopes using a reticle formed by using a die-based forming including glass molding, injection molding using a resin material, and cast molding.

Second Embodiment

A reticle 30 according to a second embodiment will next be described. The reticle 30B according to the second embodiment is so configured that the pattern lines 32a and 32b are not dark lines but transmit part of the light from an object under observation and the observer can visually recognize the object under observation through the pattern lines. The reticle 30B according to the second embodiment differs from the reticles 30A ($30A_1$, $30A_2$, and $30A_3$) according to the first embodiment having been already described in terms of only part of the cross-sectional shape of the protruding ridges 133, which are the structural elements that form the protruding sections 33a and 33b, the cross-sectional shape of the V grooves 134, which are the structural elements that form the recessed sections 34a and 34b, and the cross-sectional shapes of the protruding ridges 133 and the V grooves 134, which are the structural elements that form the protruding/recessed sections 35a and 35b, and the reticle 30B according to the second embodiment is the same as the reticles 30A ($30A_1$, $30A_2$, and $30A_3$) according to the first embodiment in terms of the other configurations. In view of the fact described above, in the following description, the same components have the same numerals and will not be redundantly be described, and different portions will be primarily described.

Figure 9:
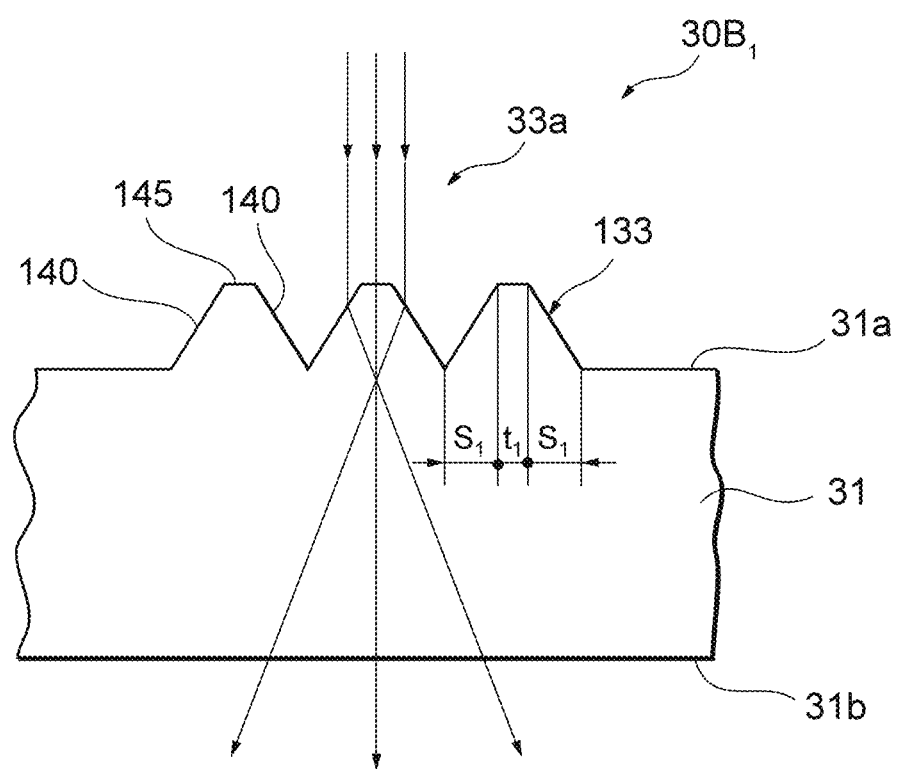
FIG. 9 is a descriptive diagram for describing a reticle according to a first configuration form in a second embodiment and is a schematic cross-sectional view of the reticle taken along a plane perpendicular to a pattern line.

FIG. 9 is a schematic cross-sectional view taken along a plane perpendicular to the pattern line 32a, and a reticle $30B_1$ according to a first configuration form will be described with reference to this figure. The reticle $30B_1$ is so configured that a light transmissive surface 145, which transmits the light incident from the side facing the object under observation so that the observer can visually recognize the transmitted light, is provided between a pair of inclining surfaces 140, 140, which form each of the protruding ridges 133. The light transmissive surface 145 has an aspect in which it truncates a top portion of the protruding ridge 133 to form a flat top portion, and the light transmissive surface 145 is formed to be roughly parallel to the pattern formation surface 31a and connect the right and left inclining surfaces 140, 140 to each other.

In the case of the thus configured reticle $30B_1$, out of the light incident from the side facing the object under observation on the reticle $30B_1$, the light incident on any of the inclining surfaces 140 is so refracted at the inclining surface 140 as to be deflected in a direction away from the optical axis Z and exits via the opposite surface 31b of the optical member. The deflected light is guided to exit out of the optical path and is therefore invisible to the observer, but a dark line image enters the observer's eye. On the other hand, out of the light incident from the side facing the object under observation on the reticle $30B_1$, the light incident on the light transmissive surface 145 is hardly refracted at the light transmissive surface 145 but exits via the opposite surface 31b along the optical axis Z of the rifle scope RS. The light having exited via the opposite surface 31b passes through the ocular lens 4, and a partial image of the object under observation enters the eye 5 of the observer.

The same holds true for adjacent other protruding ridges 133, and the light incident from the side facing the object under observation on the inclining surfaces 140, 140, 140 . . . is deflected to exit out of the optical path. A plurality of dark line images therefore enter the observer's eye, and the observer recognizes the plurality of line images integrated with one another as images of the pattern lines 32a and 32b. The light incident from the side facing the object under observation on the light transmissive surfaces 145, 145, 145 . . . passes therethrough along the optical axis Z. A plurality of partial images of the object under observation therefore enter the observer's eye, and the observer recognizes the partial images integrated with one another as an image of the object under observation.

Figure 10:
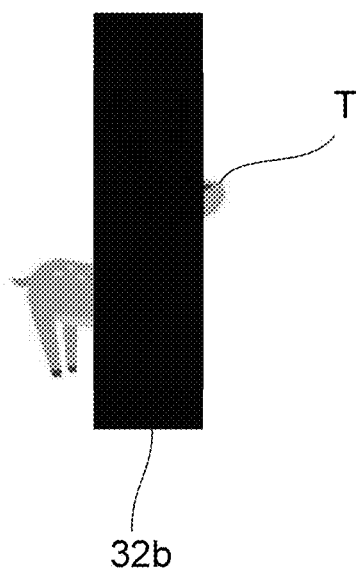
FIG. 10 is a descriptive diagram for describing how an observer recognizes images of the pattern line and an object under observation T in a situation in which the pattern line overlaps with the object under observation T.
Figure 10:
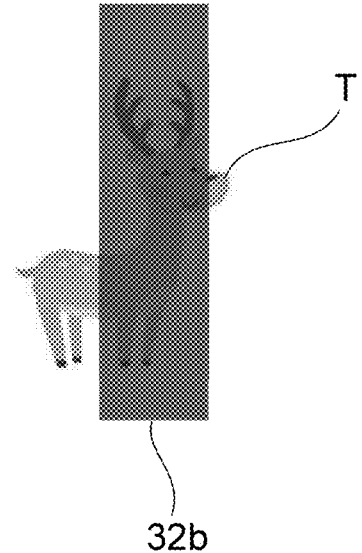

FIG. 10 is a descriptive diagram for describing how the observer recognizes the images described above in a situation in which the pattern line 32b overlaps with an object under observation T. FIG. 10(a) shows a case where any of the reticles 30A according to the first embodiment is used, and FIG. 10(b) shows a case where any of the reticles 30B according to the second embodiment is used. In the case of any of the reticles 30A according to the first embodiment, the pattern line 32b is a dark line, so that the observer sees no image of a portion of the object under observation T that is the portion with which the pattern line 32b overlaps, as shown in FIG. 10(a). On the other hand, in the case of any of the reticles 30B according to the second embodiment, the portion corresponding to the pattern line 32b has a state in which a plurality of dark line images are combined with a partial transmitted image of the object under observation T, as shown in FIG. 10(b). The observer therefore visually recognizes both the image of the pattern line 32b and the image of the object under observation and observes the object under observation T through the dim pattern line 32b. It can be said that the situation described above is similar to a situation in which a light blocking portion that transmits no light and a slit portion that transmits light are so alternately formed on a transparent glass plate as to be in close contact with each other to form a slit plate and an object under observation is observed through the slit plate.

FIG. 9 shows by way of example the configuration in which each of the light transmissive surfaces 145 is provided between a pair of inclining surfaces 140, 140 (at top of protruding ridge), which form a protruding ridge 133. The light transmissive surfaces 145 may each instead be provided between two inclining surfaces 140, 140 (at bottom between adjacent protruding ridges) of adjacent protruding ridges 133 that are the inclining surfaces 140, 140 face each other, or the light transmissive surfaces 145 may be provided both at the tops of the protruding ridges and the bottoms between the protruding ridges.

Figure 11:
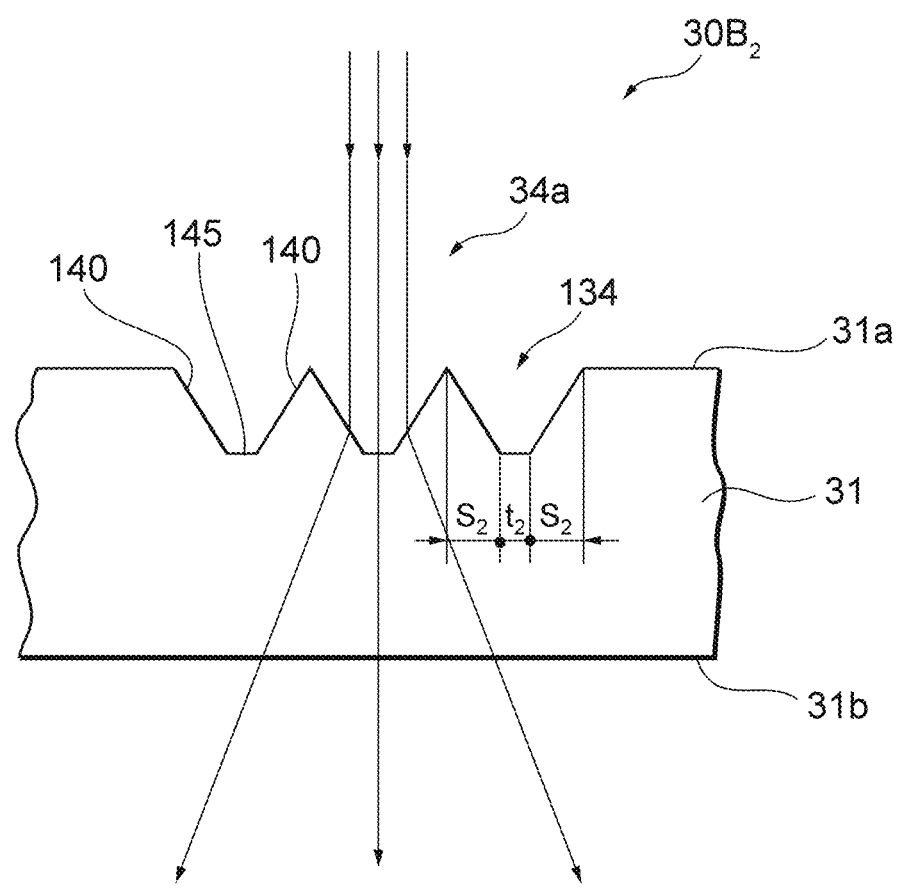
FIG. 11 is a descriptive diagram for describing a reticle according to a second configuration form in the second embodiment and is a schematic cross-sectional view of the reticle taken along a plane perpendicular to a pattern line.

FIG. 11 is a cross-sectional view of a reticle $30B_2$ according to a second configuration form taken along a plane perpendicular to the pattern line 32a. The reticle $30B_2$ is so configured that the light transmissive surface 145, which transmits the light incident from the side facing the object under observation so that the observer can visually recognize the transmitted light, is provided between a pair of inclining surfaces 140, 140 (at bottom of V groove), which form each of the V grooves 134. The light transmissive surface 145 has an aspect in which it buries the bottom of the V groove 134 to form a flat raised bottom, and the light transmissive surface 145 is formed to be roughly parallel to the pattern formation surface 31a and connect the right and left inclining surfaces 140, 140 to each other.

Also in the thus configured reticle $30B_2$, the light incident from the side facing the object under observation behaves in the same manner as in the reticle $30B_1$ according to the first configuration form. That is, out of the light incident from the side facing the object under observation on the reticle 30B$_2$, the light incident on any of the inclining surfaces 140 is so refracted at the inclining surface 140 as to be deflected in a direction away from the optical axis Z of the rifle scope RS and exits out of the optical path, so that the deflected light does not enter the observer's eye, but a dark line image enters the observer's eye. On the other hand, out of the light incident from the side facing the object under observation on the reticle 30B$_2$, the light incident on the light transmissive surface 145 is hardly refracted at the light transmissive surface 145 but travels along the optical axis Z, and a partial image of the object under observation enters the observer's eye.

The same holds true for adjacent other V grooves 134, and the light incident from the side facing the object under observation on the inclining surfaces 140, 140, 140 . . . is deflected to exit out of the optical path, and a plurality of dark line images enter the observer's eye. The observer recognizes the plurality of line images integrated with one another as images of the pattern lines 32a and 32b. The light incident from the side facing the object under observation on the light transmissive surfaces 145, 145, 145 . . . passes therethrough along the optical axis, and a plurality of partial images of the object under observation enter the observer's eye. The observer recognizes the partial images integrated with one another as an image of the object under observation.

Therefore, for example, the portion corresponding to the pattern line 32b has the state in which a plurality of dark line images are combined with a partial transmitted image of the object under observation T, and the observer observes the object under observation T through the dim pattern line 32b, as shown in FIG. 10(b).

FIG. 11 shows by way of example the configuration in which each of the light transmissive surfaces 145 is provided between a pair of inclining surfaces 140, 140 (at bottom of V groove) that form a V groove 134, and the light transmissive surface 145 may instead be provided between two inclining surfaces 140, 140 of adjacent V grooves 134, 134 (at top between adjacent V grooves) that are the inclining surfaces 140, 140 disposed back to back, or the light transmissive surfaces 145 may be provided both at the bottoms of the V grooves and the tops between the V grooves.

Figure 12:
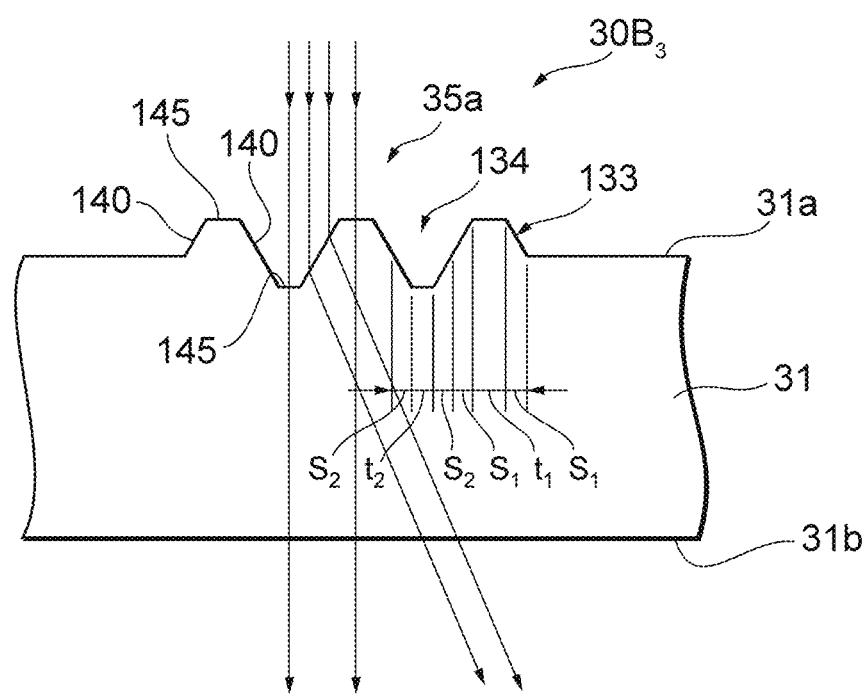
FIG. 12 is a descriptive diagram for describing a reticle according to a third configuration form in the second embodiment and is a schematic cross-sectional view of the reticle taken along a plane perpendicular to a pattern line.

A reticle 30B$_3$ according to a third configuration form is so configured that the flat light transmissive surface 145 is provided at the top of each of the protruding ridges 133 and/or the bottom of each of the V grooves 134 in each of the protruding/recessed sections 35 formed of the plurality of protruding ridges 133 and V grooves 134. FIG. 12 is a cross-sectional view of a protruding/recessed section 35a having a configuration in which the light transmissive surface 145 are formed both at the tops of the protruding ridges 133 and the bottoms of the V grooves 134. The protruding/recessed section 35a has a structure in which the reticle 30B$_1$ according to the first configuration form described above is integrated with the reticle 30B$_2$ according to the second configuration form described above, and the light incident from the side facing the object under observation behaves in the same manner as in the reticles 30B$_1$ and 30B$_2$ according to the first and second configuration forms having been already described.

That is, out of the light incident from the side facing the object under observation on the reticle 30B$_3$, the light incident on any of the inclining surfaces 140 is deflected in a direction away from the optical axis Z of the rifle scope RS and exits out of the optical path, so that the deflected light does not enter the observer's eye, but a dark line image enters the observer's eye. The observer recognizes the plurality of line images integrated with one another as images of the pattern lines 32a and 32b. On the other hand, out of the light incident from the side facing the object under observation on the reticle 30B$_3$, the light incident on the light transmissive surface 145 travels along the optical axis Z, and a partial image of the object under observation enters the observer's eye. The observer recognizes the partial images integrated with one another as an image of the object under observation. Therefore, the portion corresponding to the pattern line 32b has the state in which a plurality of dark line images are combined with a partial transmitted image of the object under observation T, and the observer observes the object under observation T through the dim pattern line 32b, as shown in FIG. 10(b).

FIG. 12 shows by way of example the configuration in which the light transmissive surfaces 145 are each provided between a pair of inclining surfaces 140, 140 (at top of protruding ridge) that form a protruding ridge 133 and between a pair of inclining surfaces 140, 140 (at bottom of V groove) that form a V groove 134, and the light transmissive surface 145 may each instead be provided only on one of the two portions described above (at top of protruding ridge, for example).

In the reticles 30B (reticle 30B$_1$, reticle 30B$_2$, and reticle 30B$_3$) according to the second embodiment described above, configuration ratios ζ of the light transmissive surface 145 to the protruding sections 33 (33a and 33b), the recessed sections 34 (34a and 34b), and the protruding/recessed sections 35 (35a and 35b) can each range from 1 to 99%. Let s$_1$ and s$_2$ be widths of each of the inclining surfaces 140 viewed along the optical axis and t$_1$ and t$_2$ be the widths of the light transmissive surface 145, as shown in FIGS. 9, 11, and 12. Under the definitions described above, the configuration ratio ζ of the light transmissive surface 145 to each of the protruding sections 33 is determined by ζ=t$_1$/(2s$_1$+t$_1$), the configuration ratio ζ of the light transmissive surface 145 to each of the recessed sections 34 is determined by ζ=t$_2$/(2s$_2$+t$_2$), and the configuration ratio ζ of the light transmissive surface 145 to each of the protruding/recessed sections 35 is determined by ζ=(t$_1$+t$_2$)/(2s$_1$+t$_1$+2s$_2$+t$_2$).

Figure 13:
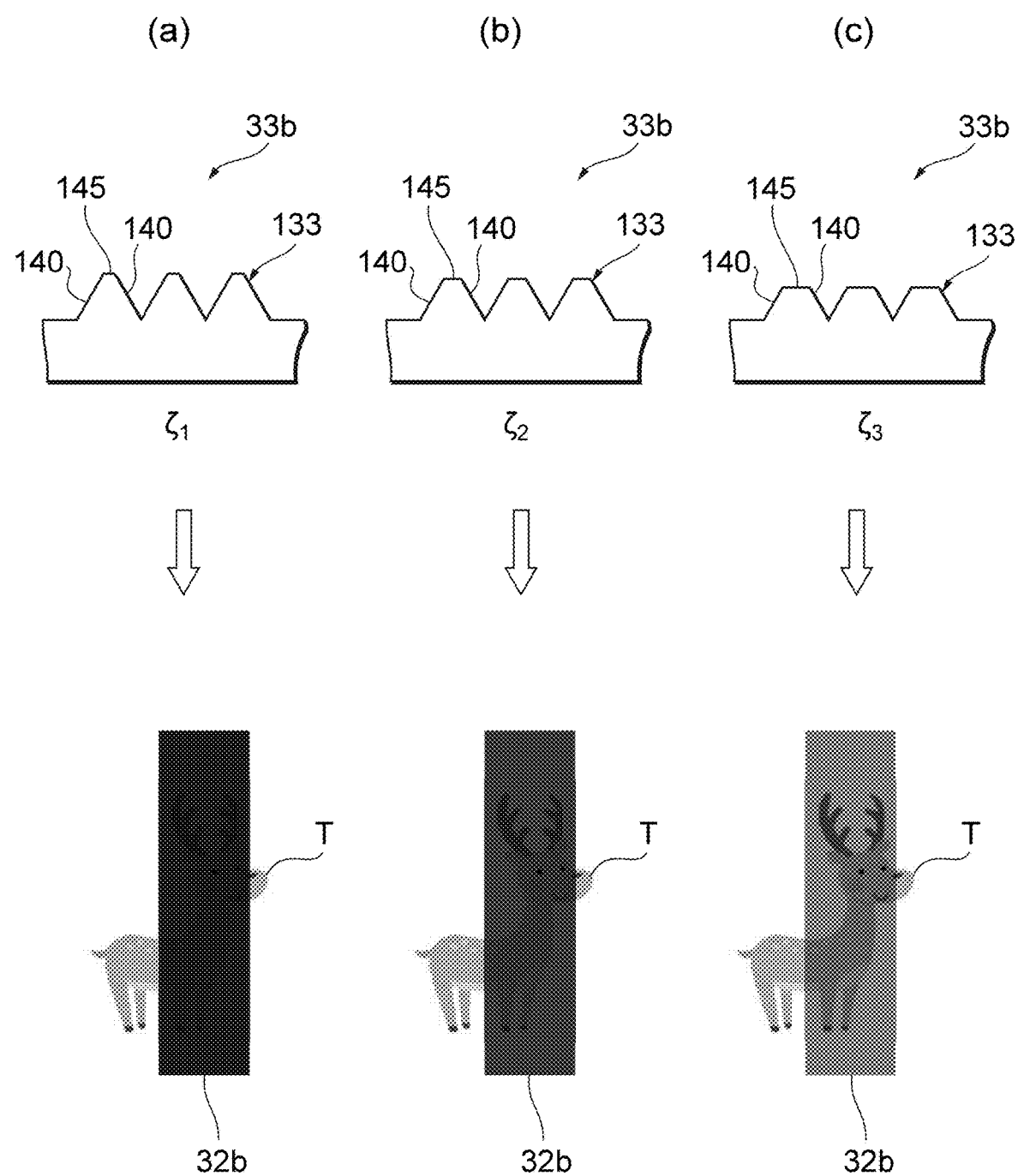
FIG. 13 is a descriptive diagram schematically showing a view of the object under observation and the pattern line with a configuration ratio of light transmissive surfaces provided in the structural element changed.

FIGS. 13(a), 13(b), and 13(c) are descriptive diagrams schematically showing a view of the object under observation T and the pattern line 32b with the configuration ratio ζ of the light transmissive surface 145 changed. The magnitudes of the configuration ratios ζ of the light transmissive surface 145 in FIGS. 13(a), 13(b), and 13(c) satisfy ζ$_1$<ζ$_2$<ζ$_3$ in the order of FIGS. 13(a), 13(b), and 13(c). The smaller the configuration ratio ζ of the light transmissive surface 145 is, the clearer the pattern line 32b is visually recognized, and the greater the configuration ratio ζ of the light transmissive surface 145 is, the clearer the object under observation T is visually recognized, as shown in FIGS. 13(a), 13(b), and 13(c). In the case where the light transmissive surface 145 are each a surface parallel to the pattern formation surface 31a, the configuration ratio of the light transmissive surface 145 is roughly equal in the meaning to the optical transmittance along the optical axis.

Contrast identification capability of a human eye ranges from about 1 to 2% (Weber-Fechner law). That is, a human eye can identify two objects that differ from each other in terms of luminance by about 1%. A person can therefore identify a pattern line in a bright background when the brightness of the pattern line is lower than that of the background by about 1% and identify an object under observation in a dark pattern line when the brightness of the object under observation is higher than that of the pattern line by about 1%. Setting the configuration ratios $\zeta$ of the light transmissive surface 145 to each of the protruding sections 33, the recessed sections 34, and the protruding/recessed sections 35 each at a value ranging from 1 to 99% therefore allows visual recognition of both the object under observation T and the pattern lines 32a and 32b. The configuration ratios $\zeta$ of the light transmissive surface 145 preferably each ranges from 10 to 40%. The reason for this is that fine movement of the object under observation T is unlikely to be visually recognized when $\zeta$<10%, whereas the density of the pattern lines 32a and 32b decreases when $\zeta$>40%, and it is therefore difficult to sight the rifle on a target. The configuration ratios $\zeta$ of the light transmissive surface 145 more preferably each ranges from 25 to 30%. The reason for this is that setting the configuration ratios $\zeta$ so as to each fall within the range described above allows visual recognition of the object under observation T and the pattern lines 32a and 32b even in a bright environment, such as a daylight environment on a sunny day, and a dim environment, such as an evening or moonlight environment, whereby a person can readily sight the rifle on a target.

Further, a human eye is believed to have resolution of about 0.1 mm. For example, when a person observers a structure in which two bright lines are formed side by side in a dark background with a naked eye, the person recognizes the bright lines as two lines when the distance between the lines is greater than 0.1 mm, whereas the person recognizes the bright lines as one line when the distance between the lines is smaller than 0.1 mm. Similarly, when a person observers a structure in which two dark lines are formed side by side in a bright background with a naked eye, the person recognizes the dark lines as two lines when the distance between the lines is greater than 0.1 mm, whereas the person recognizes the dark lines as one line when the distance between the lines is smaller than 0.1 mm. Therefore, in the reticle 30B, in which a bright line and a dark line are alternately repeated, it is preferable to set the distance between adjacent light transmissive surface 145 and the distance between adjacent inclining surfaces 140 of the reticle pattern 32 at which the observer looks are each smaller than or equal to 0.1 mm.

In the rifle scope RS, an image of any of the reticles 30B is enlarged by the ocular lens 4 and enters the observer's eye. Provided now that the ocular lens 4 provides a magnification of 5, the distance between the light transmissive surface 145 and the distance between the inclining surfaces 140 are each preferably set to be smaller than or equal to 0.1/5=0.02 mm=20 In a case where any of the reticles 30B is disposed in a first focal plane and a zoom optical system having a maximum magnification of 32 is constructed, the distance between the light transmissive surface 145 and the distance between the inclining surfaces 140 are each preferably set to be smaller than or equal to 0.1/(32/5)=0.0156 mm=15.6 μm. As described above, the distance between the light transmissive surfaces 145 and the distance between the inclining surfaces 140, in plainer words, the interval at which the protruding ridges 133 and the V grooves 134 are formed can be set in accordance with the configuration of the optical system using any of the reticles 30.

Figure 14:
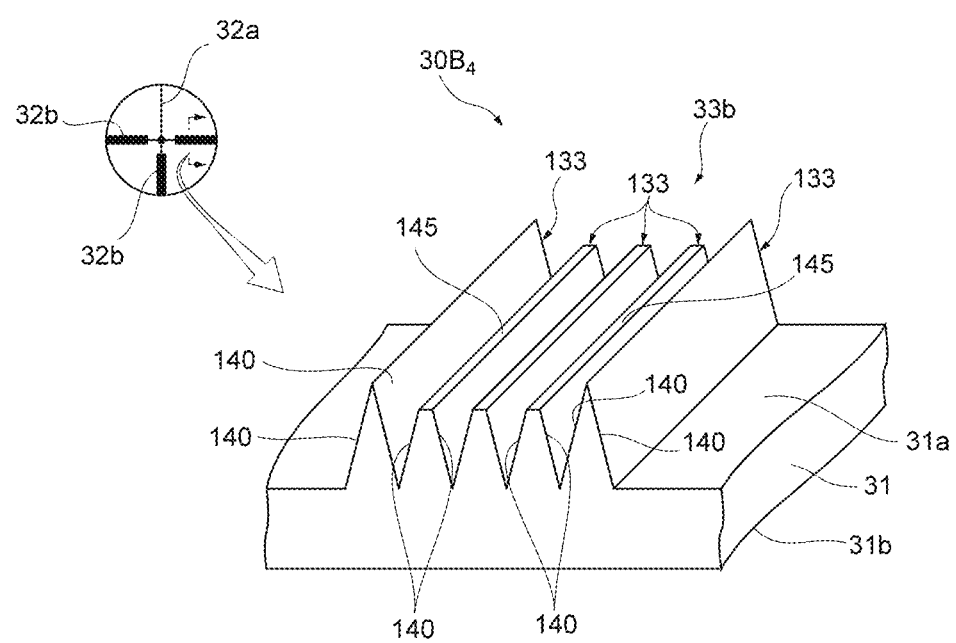
FIG. 14 is a descriptive diagram showing an example of a configuration in which the configuration ratio of the light transmissive surfaces provided in the structural element is changed in accordance with the widthwise position in a pattern line.

The above-mentioned configuration ratio $\zeta$ of the light transmissive surface 145 can be set at a different value in accordance with the widthwise or lengthwise position in a pattern line. For example, consider the pattern line 32b of a reticle $30B_4$ shown in FIG. 14, in which the protruding ridges 133 located in an outer area in the linewidth direction have the configuration ratio $\zeta$ of the light transmissive surface 145 set at a small value (low transmittance of light from object under observation), and the protruding ridges 133 located in an inner area in the linewidth direction have the configuration ratio $\zeta$ of the light transmissive surface 145 set at a large value (high transmittance of light from object under observation). Specifically, one to several protruding ridges 133 located at the outer edges in the linewidth direction have a configuration ratio that allows the line to remain black even when the intensity of outside light and the magnification of the optical system change, and protruding ridges 133 located in the area inside the outer edges in the linewidth direction have a configuration ratio that allows visual recognition of a target even when the intensity of outside light and the magnification of the optical system change. According to the configuration described above, the observer can readily sight the rifle on the target because the contour of the pattern line 32b is a dark line and is therefore clearly visually recognized, and even in a case where the target captured within the field of view is small, the observer can sight the rifle on the target without losing track of the target because the object under observation can be visually recognized inside the pattern line 32b.

Figure 15:
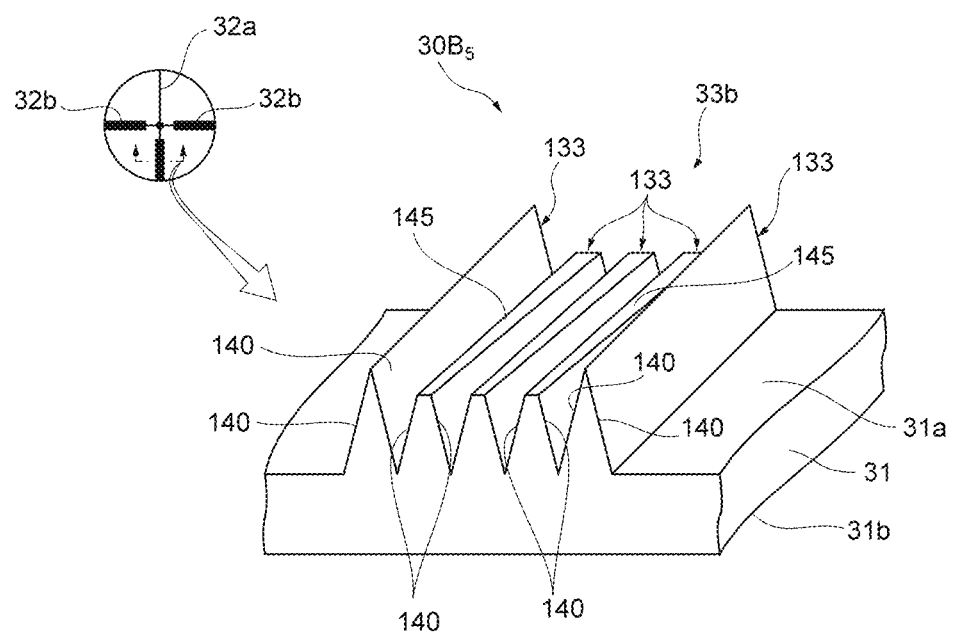
FIG. 15 is a descriptive diagram showing an example of a configuration in which the configuration ratio of the light transmissive surfaces provided in the structural element is changed in accordance with the lengthwise position in a pattern line.

Consider next the pattern line 32b in a reticle $30B_5$ shown in FIG. 15, in which protruding ridges 133 closer to the outer circumference of the reticle pattern 32 have a small configuration ratio $\zeta$ of the light transmissive surface 145 and protruding ridges 133 closer to the center of the reticle pattern 32 have a large configuration ratio $\zeta$ of the light transmissive surface 145. According to the configuration described above, the observer can readily sight the rifle on the target because the pattern line 32b is clearly visually recognized on the side facing the outer circumference of the reticle pattern 32, and even in the case where the target captured within the field of view is small, the observer can sight the rifle on the target without losing track of the target because the target can be visually recognized inside the pattern line 32b in an area close to the center of the reticle pattern 32. The example described above relates to a configuration in which a large linewidth pattern line 32b is used, and the same holds true for a small linewidth pattern line 32a.

Figure 16:
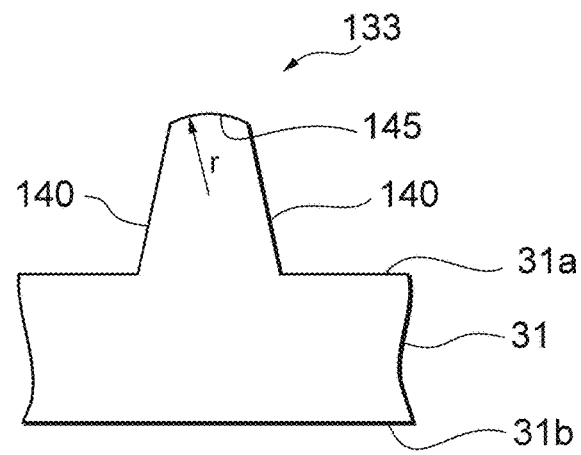
FIG. 16 is a descriptive diagram showing examples of a configuration in which the light transmissive surfaces provided in the structural element each have a radius of curvature.
Figure 16:
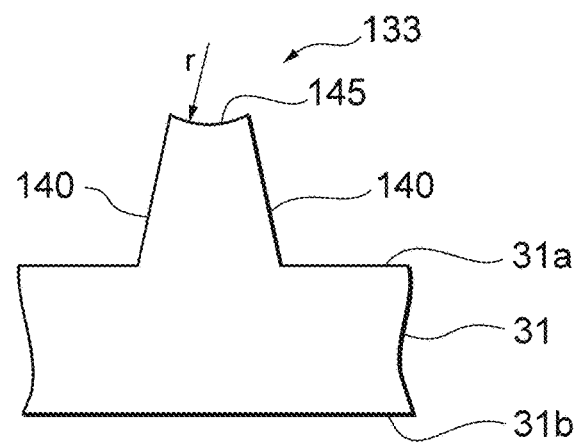
Figure 16:
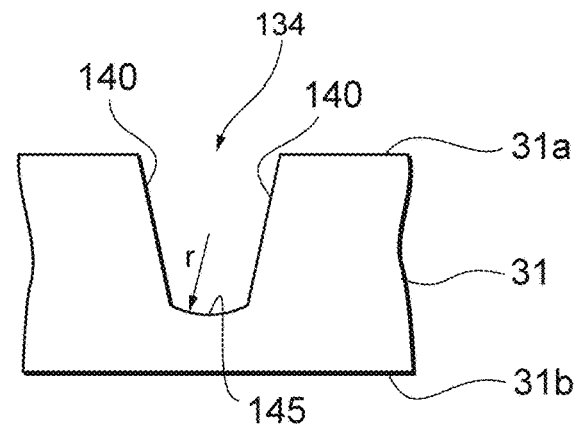

The above description has been made of the configuration in which the light transmissive surface 145 are each a flat surface roughly parallel to the pattern formation surface 31a, and the light transmissive surface 145 may instead each be a curved surface, a parabolic surface, or any other surface having a radius of curvature greater than or equal to a predetermined value. FIGS. 16(a), 16(b), and 16(c) show specific configuration examples. FIG. 16(a) shows a configuration example in which a convex light transmissive surface 145 having a radius of curvature r is formed at the top of each of the protruding ridges 133. FIG. 16(b) shows a configuration example in which a concave light transmissive surface 145 having a radius of curvature –r is formed at the top of each of the protruding ridges 133. FIG. 16(c) shows a configuration example in which a concave light transmissive surface 145 having the radius of curvature –r is formed at the bottom of each of the V grooves 134.

In the case where the light transmissive surface 145 are each a curved surface, the light incident on the light transmissive surface 145 diverges at a spread angle according to the curvature of the light transmissive surface, and part of the incident light passes through the ocular lens 4 and enters the observer's eye. The smaller the radius of curvature of each of the light transmissive surface 145, the smaller the amount of light that enters the observer's eye, and the greater the distortion of a partial image of the object under observation. The observer can, however, visually recognize the partial image of the object under observation with no large distortion as long as the radius of curvature of each of the light transmissive surface 145 is greater than or equal to the predetermined value. The predetermined value described above varies in accordance with the configuration of the rifle scope, the brightness of an object under observation, and other factors, and an image of the object under observation can be visually recognized as long as the radius of curvature is roughly greater than or equal to 2 µm.

Third Embodiment

In the first and second embodiments described above, the linear patterns 32a and 32b of the reticle pattern 32 are formed of a cluster of a plurality of structural elements in the form of the protruding ridges 133 or the V grooves 134, and the optical refraction effect provided by the inclining surfaces 140 of each of the structural elements guides the light incident on the reticle pattern 32 in such a way that the incident light exits out of the optical path along which the observer observes the reticle pattern. The configuration described above prevents the light incident on the inclining surfaces 140 of each of the structural elements from reaching the eye 5 of the observer but allows the observer to recognize the reticle pattern 32 in the form of the black lines of the linear patterns 32a and 32b. That is, the basics of the configuration described above relies on the fact that light from the "structural elements" that form the reticle pattern is guided to exit out of the observation optical path of the ocular lens 4, as shown in FIG. 5, and have basically nothing to do with the direction of the pattern or the direction of the structural elements, such as the protruding ridges and the V grooves. Therefore, the protruding ridges 133 or the V grooves 134 are not necessarily oriented in the lengthwise direction of the linear patterns and can be disposed to be perpendicular to the lengthwise direction of the linear patterns or oriented in an arbitrary direction. Further, the protruding ridges and the V grooves are each long in the direction in which the ridge lines extend but very short in the direction perpendicular to the extending direction, and the length of the ridge lines (length of pattern lines) is arbitrary. For example, the protruding ridges and the V grooves can each be formed of a short line.

Figure 17:
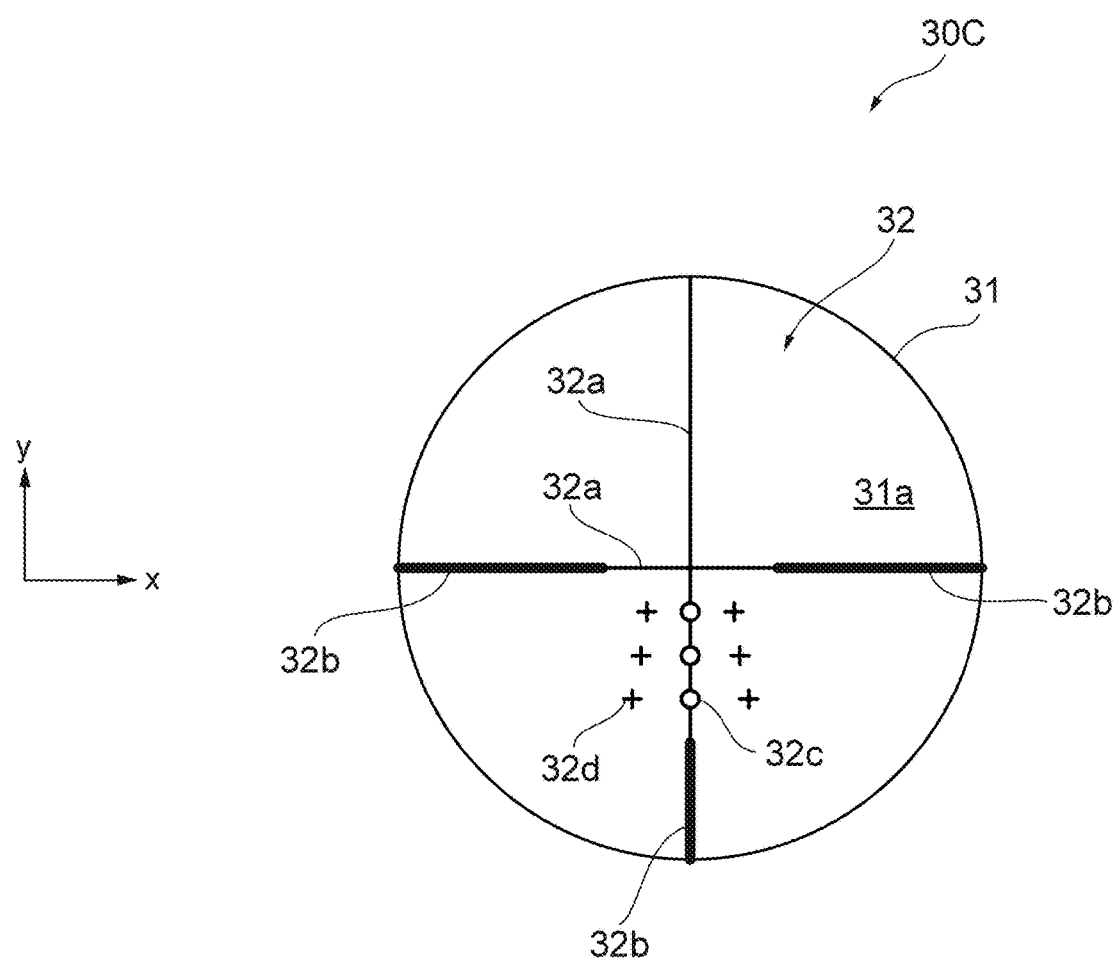
FIG. 17 is a descriptive diagram for describing a reticle according to a third embodiment and shows another configuration example of the reticle pattern.

A reticle 30C according to a third embodiment has a configuration in which structural elements that form a protruding section and/or a recessed section are each a pyramidal element and an inclining side surface extending from the top of the pyramid to the bottom thereof, that is, the pyramidal surface is used as the refraction surface. FIG. 17 shows a reticle having a pattern different to some extent from the pattern shown in FIG. 2, and the reticle 30C according to the present embodiment will be described with reference to FIGS. 17 and 18 to 25. The same components as those in the reticles 30A (30A$_1$ to 30A$_3$) according to the first embodiment and the reticles 30B (30B$_1$ to 30B$_5$) according to the second embodiment having been already described have the same numerals and will not be redundantly be described.

The reticle pattern 32 of the reticle 30C shown in FIG. 17 is formed of a plurality of ring-shaped or annular partial patterns (called ring-shaped patterns) 32c each having a relatively small diameter and a plurality of cross-shaped partial patterns (called cross patterns) 32d each having a relatively small size in the field of view of the ocular lens in addition to the cross pattern formed of the thin linear patterns 32a and the thick linear patterns 32b, which divide the field of view into four parts, as in the reticles 30A and 30B described with reference to FIG. 2. The ring-shaped patterns 32c and the cross patterns 32d are each formed of a plurality of pyramidal structural elements.

Figure 18:
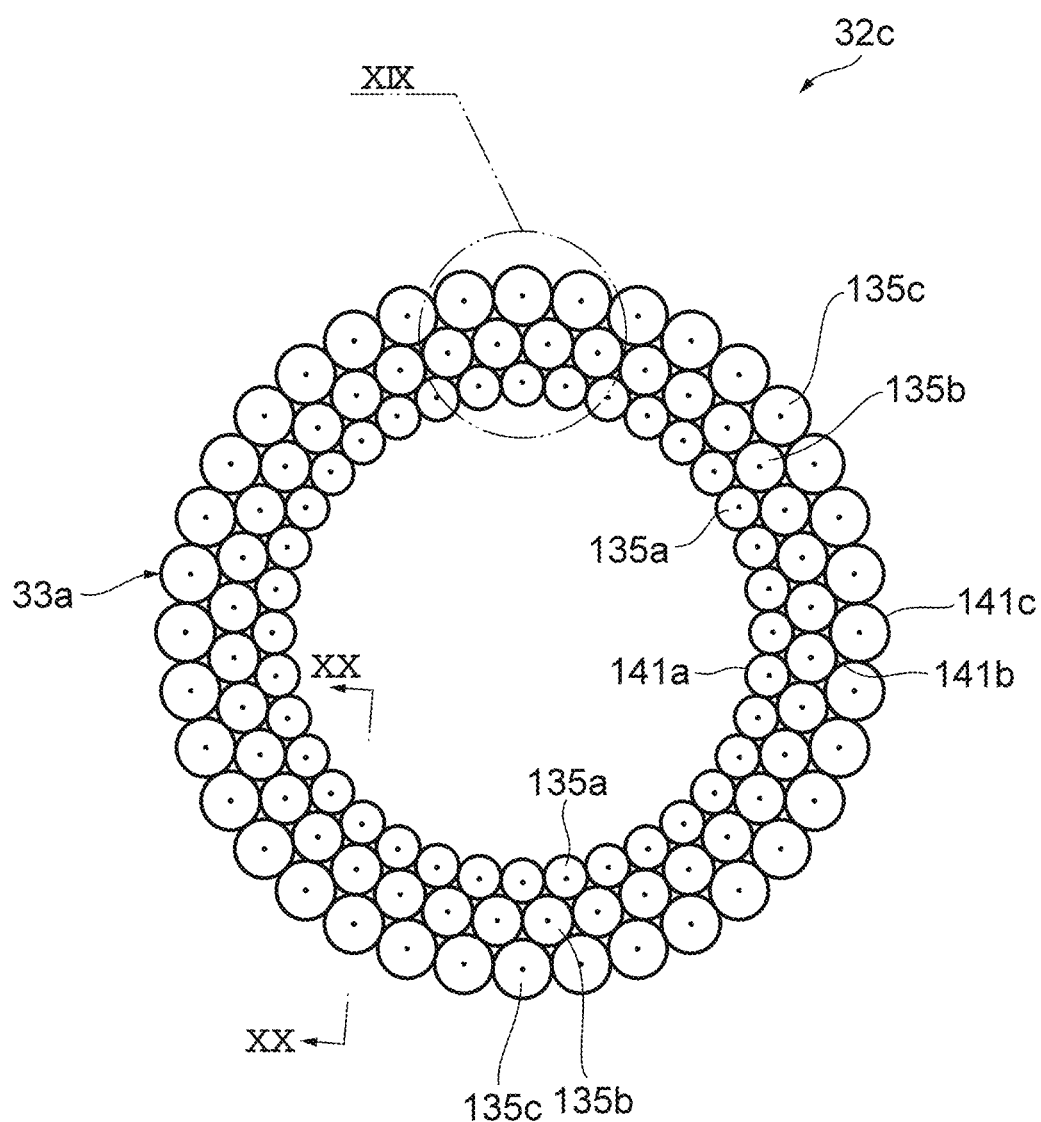
FIG. 18 is a partially enlarged view of a ring-shaped pattern of a first configuration example of a first configuration form in the third embodiment.
Figure 19:
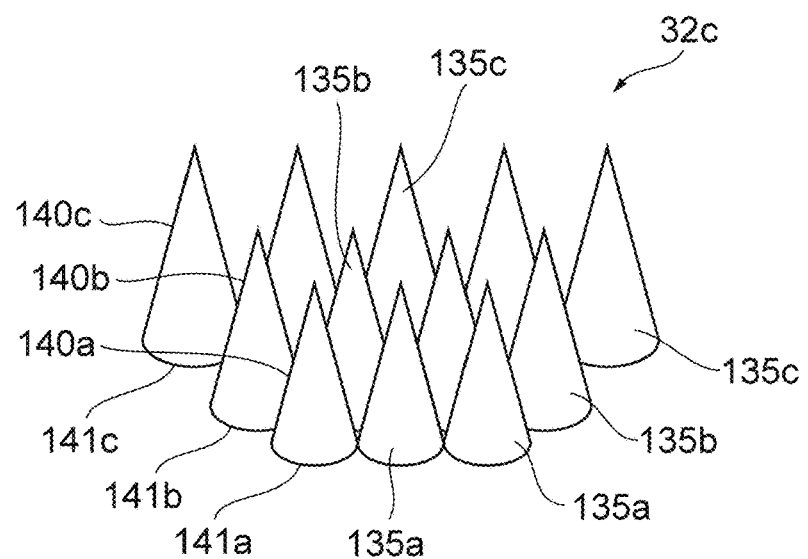
FIG. 19 is a perspective view of the area indicated by the reference character XIX in FIG. 18.
Figure 20:
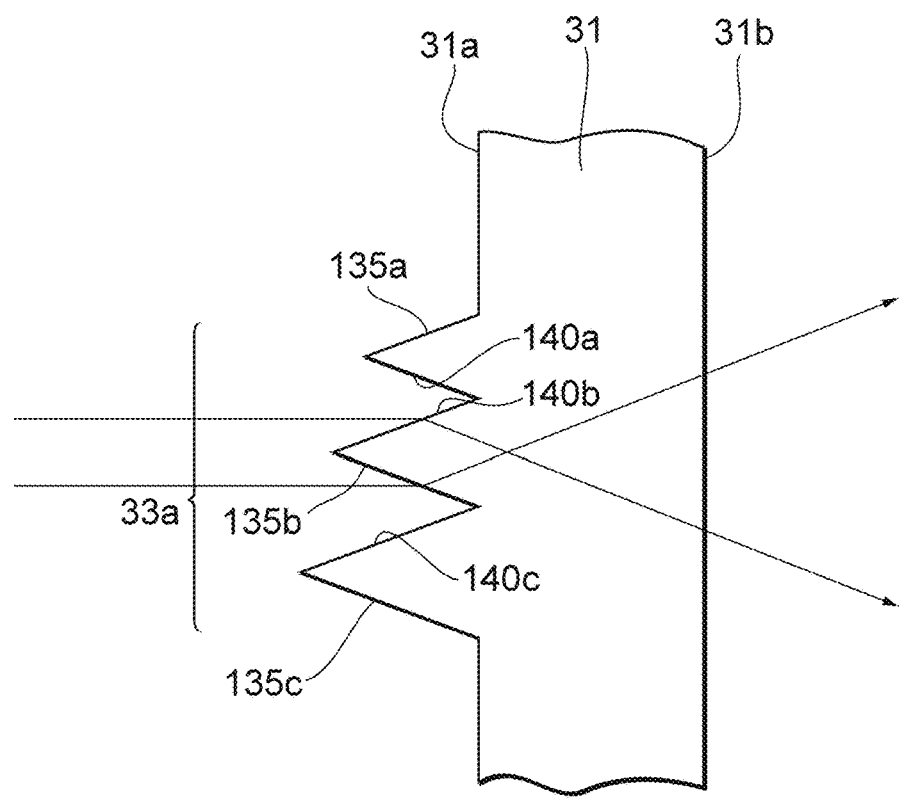
FIG. 20 is a cross-sectional view taken along the arrowed line XX-XX in FIG. 18.

As a reticle according to a first configuration form that is part of the present embodiment, a description will be made of a configuration in which the ring-shaped patterns 32c are each formed of a plurality of conical structural elements that protrude from the pattern formation surface 31a. FIGS. 18 to 20 show a first configuration example of each of the ring-shaped patterns 32c. FIG. 18 is a partially enlarged view of each of the ring-shaped patterns 32c shown in FIG. 17. FIG. 19 is a perspective view of the area indicated by the reference character XIX in FIG. 18. FIG. 20 is a cross-sectional view taken along the arrowed line XX-XX in FIG. 18. The ring-shaped patterns 32c are each the protruding section 33a formed of a plurality of conical structural elements 135a, 135b, and 135c and are each a curved partial pattern that forms the reticle pattern 32.

In the present configuration example, the ring-shaped patterns 32c are each formed by arranging a plurality of conical structural elements along a circle in such a way that the bottom edges of the conical structural elements are in contact with each other to form a single-row circular pattern and setting conical structural elements along the inner and outer circumferences adjacent to the single-row circular pattern in such a way that the bottom edges of the conical structural elements are in contact with each other to form multiple-row (three rows in FIG. 18) circular patterns in a concentric manner. In other words, the structural element 135b, which is the center-row circular pattern out of the three rows, has a configuration in which not only are bottom edges 141b of right and left structural elements in the same row in contact with each other but the bottom edges 141b are in contact with bottom edges 141a of two structural elements 135a, 135a in the inner circumferential row and the bottom edges 141b are in contact with bottom edges 141c of two structural elements 135c, 135c in the outer circumferential row. That is, the plurality of conical structural elements are so densely arranged in accordance with the shape of the partial pattern that the bottom edges 141a, 141b, and 141c of the structural elements are contact with each other.

The structural elements 135a, 135b, and 135c, which form the rows, have the same vertex angle of the cones (conical angle) a but have different sizes (different diameters of bottom edges 141a, 141b, and 141c and different heights of cones), that is, the structural elements 135a on the inner circumferential side are each formed of a cone having a small height (having a small diameter of bottom edge 141a) with respect to the cone that forms each of the structural elements 135b in the central row, and the structural elements 135c on the outer circumferential side are each formed of a cone having a large height (having a large diameter of bottom edge 141c) with respect to the cone that forms each of the structural elements 135b in the central row.

The side surfaces of the structural elements 135a, 135b, and 135c, that is, pyramidal surfaces 140a, 140b, and 140c of the cones are each an inclining surface inclining by α/2 with respect to the optical axis Z of the rifle scope RS (axially symmetric inclining surface) and are each a refraction surface that refracts the light incident via the objective lens 1. The light incident via the objective lens 1 is therefore refracted at the side surfaces 140a, 140b, and 140c of the structural elements 135a, 135b, and 135c, separates away from the optical axis Z, and is guided to exit out of the observation optical path of the ocular lens 4, as described with reference to FIGS. 3 and 5 and other figures. The light refracted at the side surfaces (140a, 140b, and 140c) of the structural elements 135 (135a, 135b, and 135c) therefore does not enter the eye 5 of the observer via the ocular lens 4, and the observer visually recognizes the ring-shaped patterns 32c in the form of dark pattern images superimposed on an image of the object under observation.

In the thus configured reticle 30C, the ring-shaped patterns 32c formed of the multiple-row circular patterns are so densely arranged that the bottom edges 141a, 141b, and 141c of the structural elements 135a, 135b, and 135c, which form the rows, are in contact with each other. A reticle having a relatively plain configuration and having curved partial patterns, such as the ring-shaped patterns 32c, can therefore be provided. In the ring-shaped patterns 32c in the present configuration example, the structural elements 135a, 135b, and 135c, which form the rows, have the same vertex angle $\alpha$ of the cones but have different heights of the cones and different diameters of the bottom edges 141a, 141b, and 141c. In a reticle manufacturing method described below (called a reticle manufacturing method using an indentation method for convenience), a diamond indenter having a conical shape having a vertex angle $\alpha$ is pressed against a die surface of a forming die to form conical recesses so shaped as to mate with the shapes of the structural elements 135a, 135b, and 135c. In this process, the conical recesses corresponding to the structural elements 135a, 135b, and 135c can be readily formed by adjusting the pressing force exerted on the diamond indenter, which presses the die surface, to control the depth to which the diamond indenter penetrates into the die surface. The single diamond indenter can therefore readily form conical recesses corresponding to a plurality of types of structural element having different sizes, whereby the die manufacturing cost can be reduced.

Figure 21:
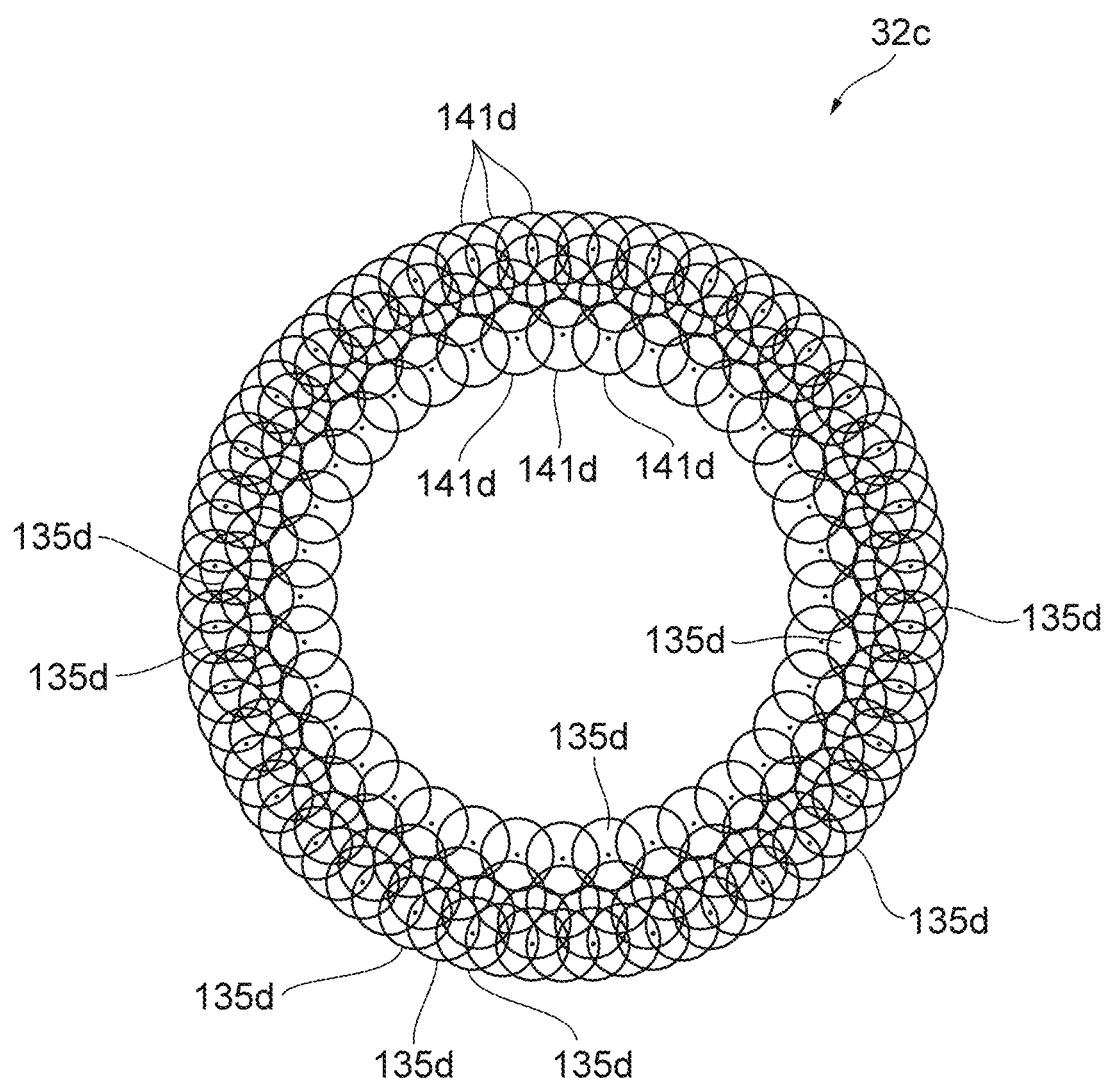
FIG. 21 is a partially enlarged view of a ring-shaped pattern of a second configuration example of the first configuration form in the third embodiment.

FIG. 21 shows a second configuration example of the ring-shaped patterns 32c. FIG. 21 is a partially enlarged view of each of the ring-shaped patterns 32c according to the present configuration example. The ring-shaped pattern 32c shown in FIG. 21 is also formed by arranging conical structural elements along a circle to form a single-row circular pattern and further forming multiple-row (basically three rows in FIG. 21) circular patterns having different diameters in a concentric manner, as is the ring-shaped patterns according to the first configuration example. In the ring-shaped pattern 32c according to the present configuration example, however, the vertex angles $\alpha$ and the sizes of conical structural elements 135d (height of cones and diameter of bottom edges of cones) are equal to one another irrespective of which row each of the structural elements 135d belongs to, and the circumferential orientations of the structural elements 135d and angular intervals at which the structural elements 135d are arranged are also equal to one another (10° in the present configuration example). Further, in the circular pattern in each of the rows, imaginary circles 141d, 141d, which represent the bottom edges of the right and left conical structural elements 135d, 135d adjacent each other, overlap with each other, and in inner and outer circumferential circular patterns adjacent to each other, the imaginary circles 141d, 141d, which represent the bottom edges of the right and left conical structural elements 135d, 135d adjacent each other, overlap with each other.

In the configuration example shown in FIG. 21 by wat of example, in addition to the three rows described above, the inner circumferential row, the central row, and the outer circumferential row, an additional circular pattern in an intermediate row is formed between the circular pattern in the outer circumferential row and the circular pattern in the central row with the circumferential angular positions of the structural elements 135d in the intermediate row shifted by a half interval (5°) from those of the circular patterns in the three rows. Further, an outer-circumferential-row additional circular pattern is formed along the same circumference along which the outer-circumferential-row circular pattern is formed with the circumferential angular positions of the structural elements 135d of outer-circumferential-row additional circular pattern shifted by a half interval (5°) from those of the circular patterns in the three rows (in the same circumferential angular positions as those in the intermediate-row additional circular pattern). In other words, the circular pattern in the outer circumferential row has a configuration in which the structural elements 135d are densely formed at ½ angular intervals as compared with the circular patterns in the central row and the inner circumferential row. Further, an additional circular pattern in an intermediate row is provided between the outer circumferential row and the central row, so that the density of the structural elements 135d increases toward the outer circumference.

The side surfaces of each of the structural elements 135d (pyramidal surface of cone) are each an inclining surface inclining by $\alpha/2$ with respect to the optical axis Z of the rifle scope RS and are each a refraction surface that refracts the light incident via the objective lens 1. The light incident via the objective lens 1 is therefore refracted at the side surfaces of the structural elements and guided to exit out of the observation optical path of the ocular lens 4. The observer therefore visually recognizes the ring-shaped patterns 32c in the form of dark pattern images superimposed on an image of the object under observation. In the present configuration example, the imaginary circles 141d, 141d, which represent the bottom edges of the right and left conical structural elements 135d, 135d adjacent each other in the same row, overlap with each other, and in inner and outer circumferential circular patterns adjacent to each other, the imaginary circles 141d, 141d, which represent the bottom edges of the conical structural elements 135d, 135d, overlap with each other.

Therefore, according to the thus configured reticle, the configuration ratio of the refraction surfaces (inclining surfaces inclining by $\alpha/2$ with respect to optical axis Z) 140 to the entire ring-shaped pattern 32c can be increased, as compared with the case where the bottom edges of the adjacent conical structural elements are in contact with each other, whereby the visibility of the pattern can be improved. Further, since the structural elements of the outer circumferential circular pattern are arranged at small intervals (at high density), the observer visually recognizes the contour of each of the ring-shaped patterns 32c as a smooth curve, and there is no light transmissive surface that does not refract the light incident thereon but directly transmits the incident light, whereby a reticle that provides high contrast and good visibility can be provided.

Figure 22:
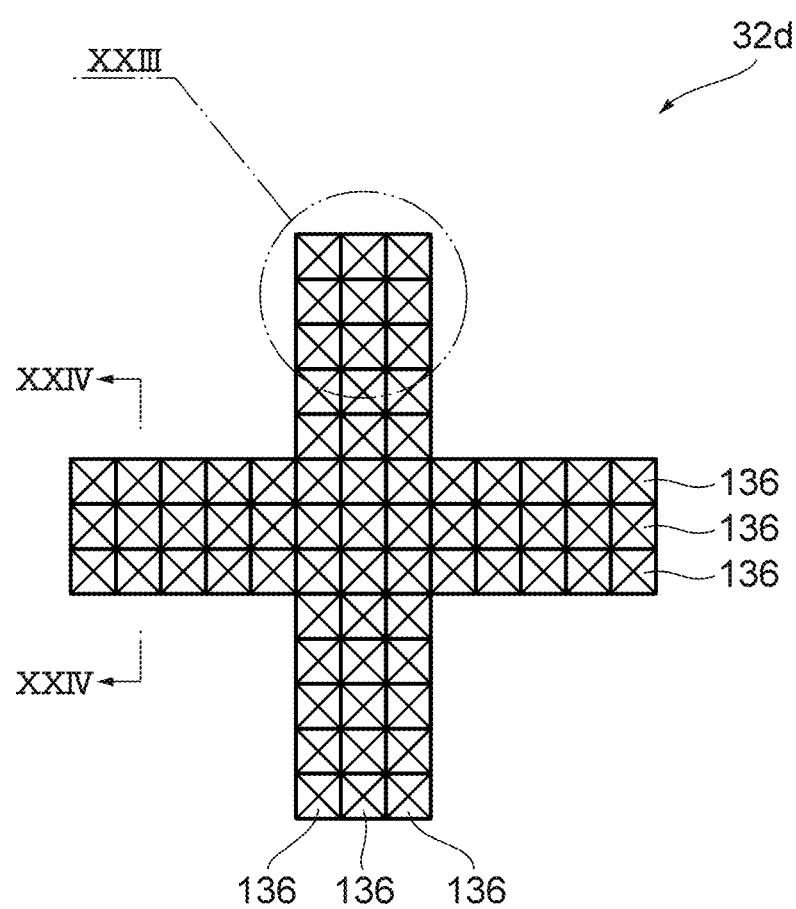
FIG. 22 is a partially enlarged view of a cross pattern according to a second configuration form in the third embodiment.
Figure 23:
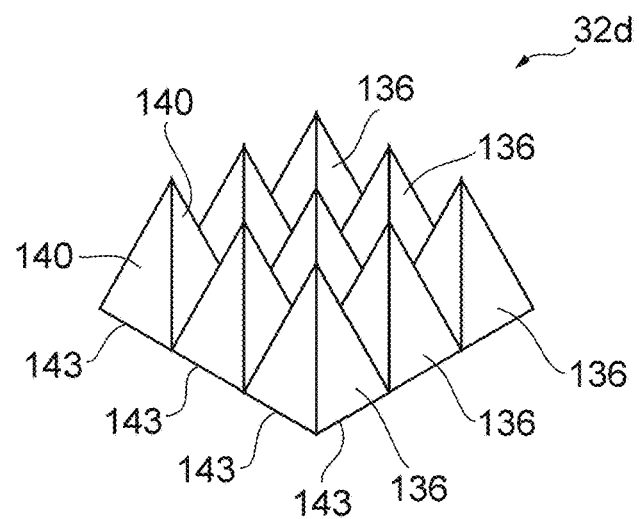
FIG. 23 is a perspective view of the area indicated by the reference character XXIII in FIG. 22.
Figure 24:
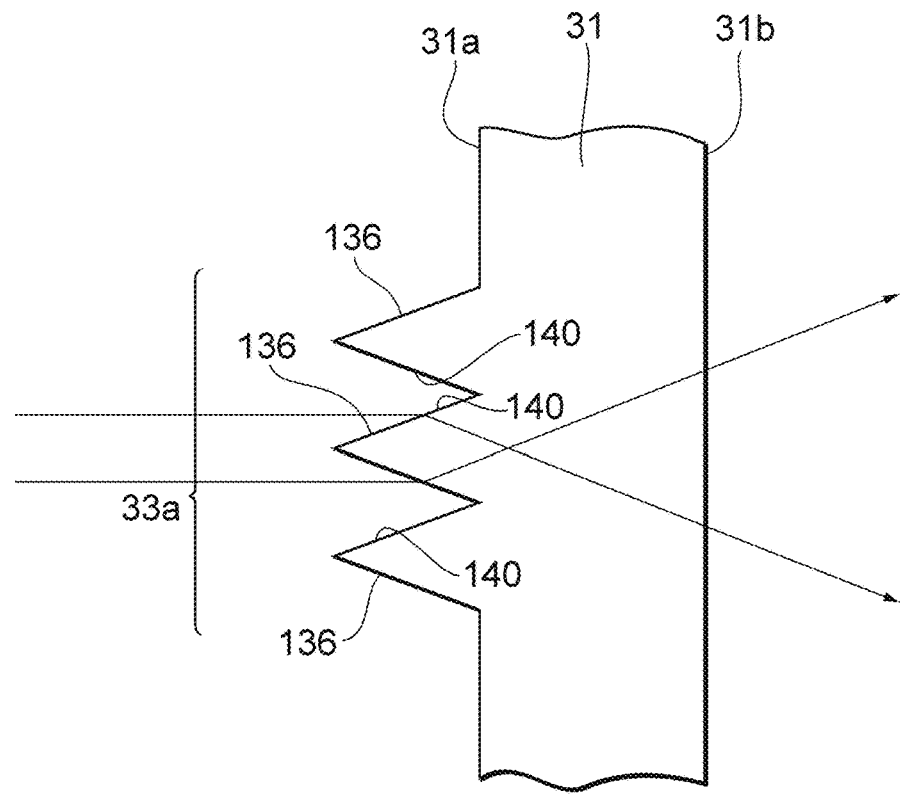
FIG. 24 is a cross-sectional view taken along the arrowed line XXIV-XXIV in FIG. 22.

As a reticle according to a second configuration form that is part of the present embodiment, a description will next be made of a configuration example in which the cross patterns 32d are each formed of a plurality of quadrangular pyramidal structural elements 136, which protrude from the pattern formation surface 31a. FIGS. 22 to 24 show an example of the configuration of the cross patterns 32d. FIG. 22 is a partially enlarged view of each of the cross patterns 32d shown in FIG. 17. FIG. 23 is a perspective view of the area indicated by the reference character XXIII in FIG. 22. FIG. 24 is a cross-sectional view taken along the arrowed line XXIV-XXIV in FIG. 22. The cross patterns 32d are each the protruding section 33a formed of a plurality of quadrangular pyramidal structural elements 136, 136, 136 . . . and are each a linear partial pattern that forms the reticle pattern 32.

In the present configuration example, the cross patterns 32d are each configured by linearly arranging quadrangular pyramidal structural elements 136 in such a way that bottom edges 143 thereof are in contact with each other to form a one-row minute line, arranging the minute line in a plurality of rows (three rows in FIG. 22) in parallel to one another to form a single short line, and further arranging the short line in two directions in such a way that the short lines interest each other at right angles in the form of a cross. In other words, the plurality of quadrangular pyramidal structural elements 136, 136, 136 . . . are so densely arranged in accordance with the shape of the partial pattern that the bottom edges 141 of the structural elements 136 are in contact with each other. In the configuration example shown in FIGS. 22 to 24, the structural elements 136, 136, 136 . . . are each a regular quadrangular pyramid, and the vertex angles (angle made by side surfaces of structural element) a and the sizes (length of bottom edge 143, height of quadrangular pyramid) of the structural elements 136 arranged in the respective positions are equal to one another.

The four side surfaces 140, 140, 140, 140 of each of the structural elements 136, that is, the pyramidal surfaces of each of the quadrangular pyramids, are each an inclining surface inclining by α/2 with respect to the optical axis Z of the rifle scope RS and are each a refraction surface that refracts the light incident via the objective lens 1. The light incident via the objective lens 1 is therefore refracted at the side surfaces 140 of the structural elements to depart from the optical axis Z and is guided to exit out of the observation optical path of the ocular lens 4. The light refracted at the side surfaces 140 of the structural elements 136 therefore does not enter the eye 5 of the observer via the ocular lens 4, and the observer visually recognizes the cross patterns 32d in the form of dark pattern images superimposed on an image of the object under observation.

Figure 25:
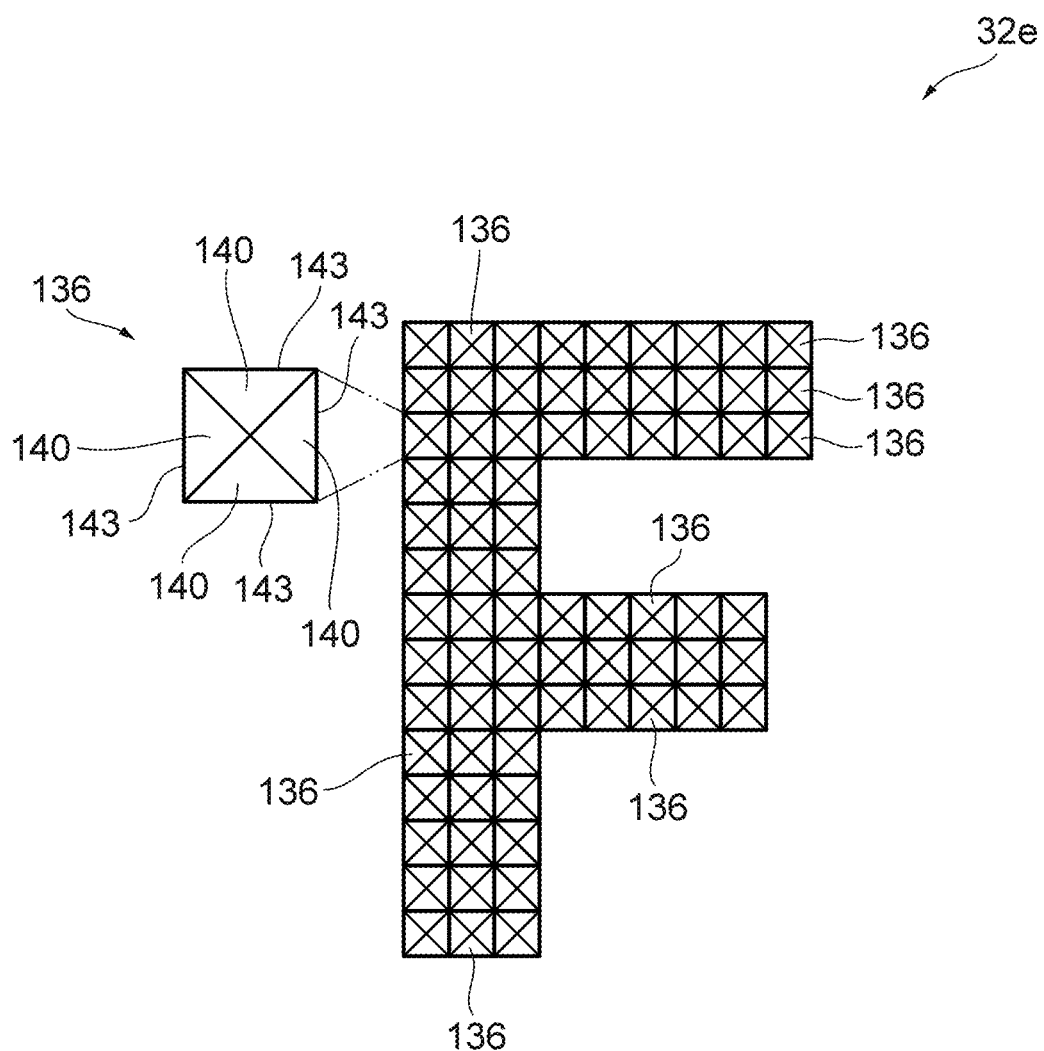
FIG. 25 is a partially enlarged view of a letter pattern according to a third configuration form in the third embodiment.

As a reticle according to a third configuration form that is part of the present embodiment, a description will be made of a configuration in which a letter, a figure, or any other partial pattern is formed by the plurality of quadrangular pyramidal structural elements 136, which protrude from the pattern formation surface 31a. FIG. 25 shows a configuration example in which a letter pattern 32e, which represents the alphabetical letter "F", is formed by a plurality of quadrangular pyramidal structural elements 136, 136, 136 . . . , which protrude from the pattern formation surface 31a. FIG. 25 is a partially enlarged view of the letter pattern 32e similar to that shown in FIG. 22. Comparison between the cross patterns 32d shown in FIG. 22 and the letter pattern 32e shown in FIG. 25 clearly shows that the method for forming the letter pattern 32e is the same as the method for forming the cross patterns 32d, and the formation method is achieved by densely arranging a plurality of quadrangular pyramidal structural elements 136, 136, 136 . . . in accordance with the shape of the partial pattern in such a way that the bottom edges 143 of the structural elements 136 are in contact with each other.

The side surfaces 140 of each of the structural elements 136 are each an inclining surface inclining by α/2 with respect to the optical axis Z of the rifle scope RS and are each a refraction surface that refracts the light incident via the objective lens 1. The light incident via the objective lens 1 is therefore refracted at the side surfaces 140 of the structural elements, separates away from the optical axis Z, and is guided to exit out of the observation optical path of the ocular lens 4. The light refracted at the side surfaces 140 therefore does not enter the eye 5 of the observer via the ocular lens 4, and the observer visually recognizes the letter pattern 32e in the form of a dark pattern image superimposed on an image of the object under observation.

The cross patterns 32d and the letter pattern 32e described above, in each of which the structural elements 136, 136, 136 . . . , which form a protruding section, each have a quadrangular pyramidal shape and are so arranged that the bottom edges 143, 143 of adjacent structural elements 136, 136 are in contact with each other with not gap therebetween to form a partial pattern having a desired shape. A configuration ratio η of the refraction surfaces (inclining surfaces inclining by α/2 with respect to optical axis Z) 140 to each of the entire partial patterns 32d and 32e can be roughly 100% (η≅100%). Further, the structural elements 136 are densely arranged with no gap therebetween in the partial pattern and along the contour thereof. A reticle that has a clear pattern shape and provides high contrast and good visibility can therefore be provided.

In the above description, the structural elements 135 (135a, 135b, 135c, and 135d), which each have a conical shape, and the structural elements 136, which each have a regular quadrangular pyramidal shape, have been presented as examples of the pyramidal structural elements, but the shape of the structural elements is not limited thereto. That is, the structural elements each only need to be so configured that the inclination angle of the inclining surface that is the side surface of the pyramidal shape and forms a refraction surface with respect to the optical axis Z is α/2. For example, the structural elements may each be a triangular pyramid, a quadrangular pyramid having bottom edges that differ from one another in length, a pentagonal pyramid, a hexagonal pyramid, or any other polygonal pyramid. Further, the configuration in which a plurality of pyramidal structural elements form a relatively small partial pattern in the field of view of the ocular lens has been presented by way of example, and a plurality of pyramidal structural elements can instead form a relatively large partial pattern in the field of view. For example, the "short line" described with reference to the cross patterns 32d can be provided in an appropriate number of rows and extended to form each of the linear patterns 32a and 32b having been already described.

The present embodiment has been described with reference to the configuration in which the ring-shaped patterns 32c, the cross patterns 32d, and the letter pattern 32e are each formed as the protruding section 33a, which protrudes from the pattern formation surface 31a, but needless to say, these partial patterns can each instead be configured as the recessed section 34, which is recessed more than the pattern formation surface 31a, to achieve the same function. The detailed configuration relating to the angle α/2 of the inclining surfaces 140 as the refraction surface described with reference to FIG. 8 also holds true for the reticle 30C according to the present embodiment. Further, the fact that the brightness of a pattern portion can be controlled by employing the configuration in which the top or bottom of each of the structural elements is partially formed of a flat surface as described in the second embodiment with reference to FIGS. 9 to 16 is also applicable to the reticle 30C according to the present embodiment.

Fourth Embodiment

A method for manufacturing the reticles 30A, 30B, and 30C according to the first to third embodiment described above will next be described. The reticles 30 (30A, 30B, and 30C) can be produced by using a plurality of types of manufacturing method in accordance with the material of the optical member 31 and the form of the reticle pattern 32. In the present embodiment, a description will be made of a manufacturing method used in a case where the material of the optical member 31 is a transparent resin material typically used with an optical apparatus and the reticle is produced in injection molding using a forming die.

The method for manufacturing any of the reticles 30 includes the following steps (processes/procedures):

Step of performing machining to form the structure corresponding to the outer shape of the reticle in a die;

Step of plating the surface of the die described above with a metal;

Step of forming a plurality of minute structures corresponding to the structural elements in the die surface on which the metal has been plated to form a structure corresponding to the protruding sections and/or the recessed sections; and Step of setting the die having the structure corresponding to the protruding sections and/or the recessed sections formed therein in a forming machine to form the reticle.

The "minute structures corresponding to the structural elements" are reversed structural elements having the reversed recessed/protruding shape of the protruding/recessed structural elements. The same holds true for the "structure corresponding to the protruding sections" and the "structure corresponding to the recessed sections."

The material of the die can be a material typically used in injection molding, for example, STAVAX provided by BOHLER-UDDEHOLM. The metal plating performed on the die surface only needs to provide relatively high surface hardness (higher than or equal to Vickers hardness of 450, more preferably higher than or equal to Vickers hardness of 800, for example) and allow formation of a plated layer thicker than the height of the structural elements, for example, electroless nickel plating and hard chrome plating.

Means for forming the minute structures corresponding to the structural elements in the die surface can be selected as appropriate in accordance with the shape of the structural elements, which form the reticle pattern. For example, in a case where the structural elements are, for example, the linear protruding ridges 133 or V grooves 134, which each have a length l in the direction of the pattern is greater than a width b in the direction perpendicular to the pattern (b<<l), as in the case of the reticle 30A according to the first embodiment and the reticle 30B according to the second embodiment, the minute structures corresponding to the structural elements are preferably formed by cutting-based formation (called "cutting method" for convenience). On the other hand, in a case where the structural elements are formed of a cluster of cones, quadrangular pyramids, or any other pyramids arranged in accordance with the shape of the pattern, as in the case of the reticle 30C according to the third embodiment, it is preferable to use a method for using a diamond indenter having a pyramidal tip processed to have a vertex angle $\alpha$ (pyramidal surface inclination angle $\alpha/2$) and pressing the diamond indenter against the surface of the die to form minute structures (indentations) inverse to the shapes of the structural elements (called indentation method for convenience). The cutting method and the indentation method can be combined with each other as appropriate in accordance with the configuration of the reticle pattern 32.

The thus produced die is placed in an injection molding machine, and a transparent resin material is injected into the die to form any of the reticles 30 (30A, 30B, and 30C). An example of the transparent resin material suitable for an optical apparatus, such as a reticle, may include DELPET (registered trademark) 80N provided by Asahi Kasei Corp.

Finally, the step of forming an antireflection film to the structural element group that form the protruding sections 33, the recessed sections 34, and the protruding/recessed sections 35 can be added. The antireflection film may be formed on the front surface of the reticle 30.

The reticle manufactured by carrying out the steps described above was actually attached to a telescope for checking the field of view. The checking showed that the reticle pattern 32 formed on the reticle was successfully observed as a clear dark pattern.

Fifth Embodiment

Figure 26:
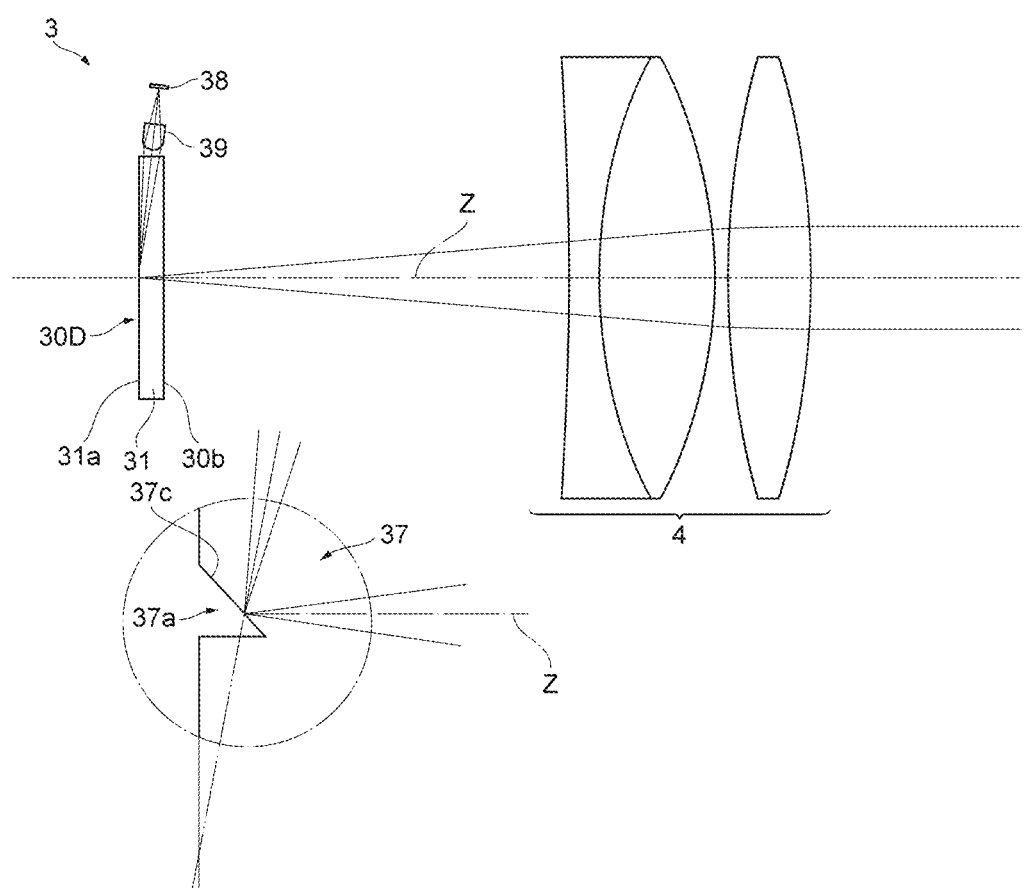
FIG. 26 is a descriptive diagram for describing the configuration of a reticle unit shown as a fifth embodiment and a descriptive diagram for describing the optical path of illumination light.
Figure 27:
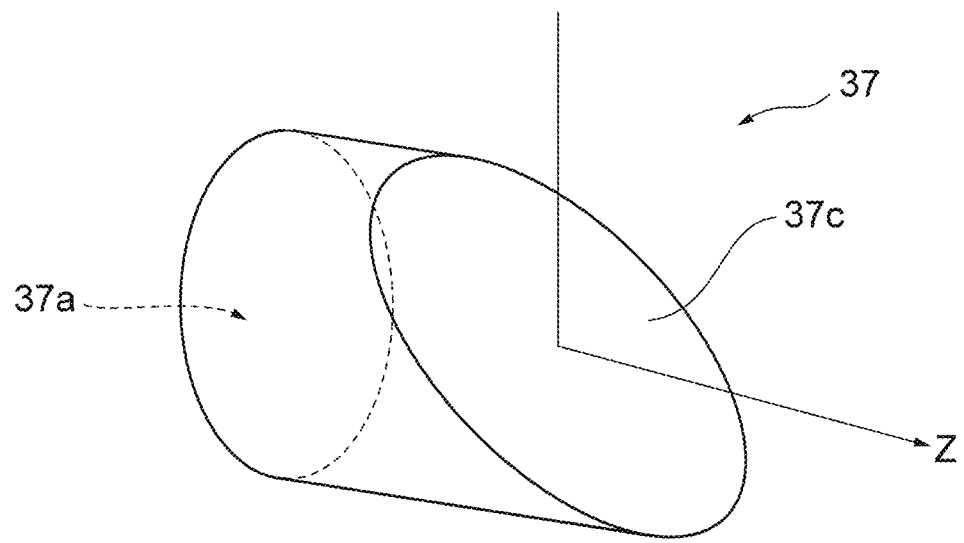
FIG. 27 is a descriptive diagram for describing the configuration of the reticle unit and a perspective view of a reflector formed on the pattern formation surface of the reticle.
Figure 28:
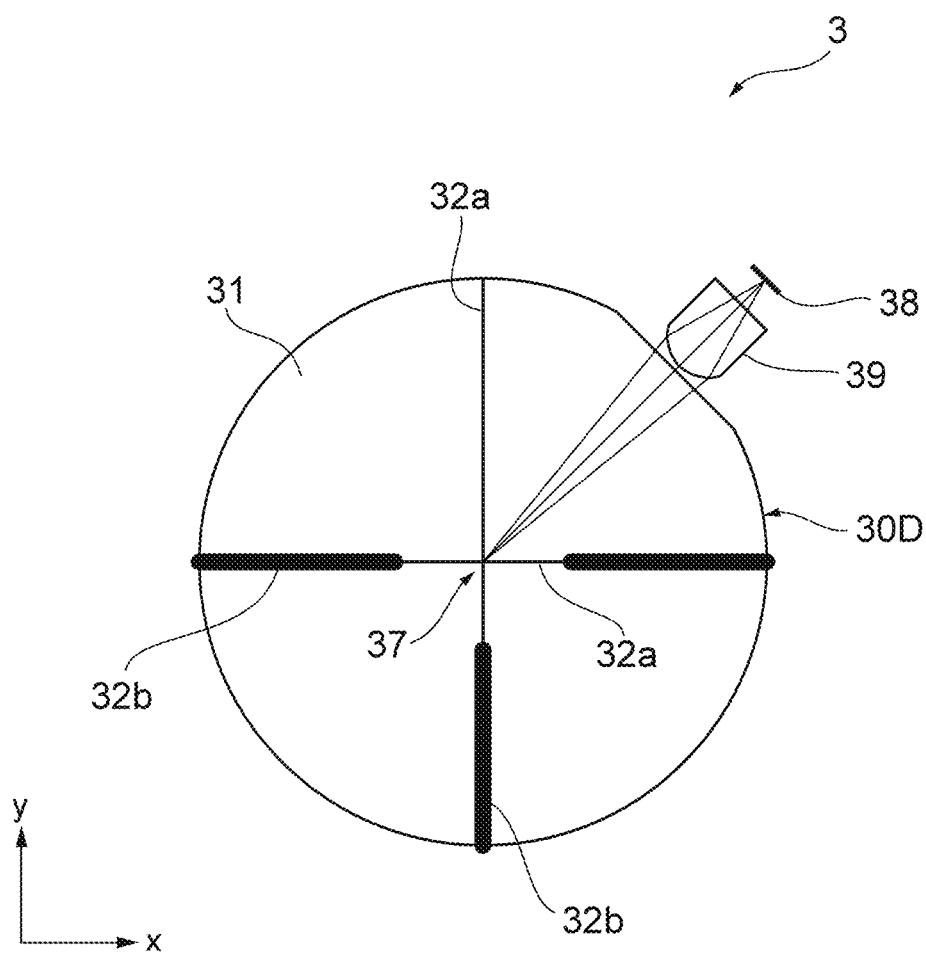
FIG. 28 is a descriptive diagram for describing the configuration of the reticle unit and a front view of the reticle unit showing the state in which the illumination light is projected on the reticle pattern.

A reticle unit 3 including a pointer at the center of the reticle pattern 32 will next be described as a fifth embodiment with reference to FIGS. 26 to 28. FIGS. 26 to 28 are descriptive diagrams for describing the configuration of the reticle unit 3. FIG. 26 is a descriptive diagram for describing the optical path of illumination light. FIG. 27 is a perspective view of a reflector formed on the pattern formation surface 31a of the reticle. FIG. 28 is a front view of the reticle unit showing the state in which the illumination light is projected on the reticle pattern 32.

The reticle unit 3 includes a reticle 30D, a light source 38, which radiates the illumination light, and a light collector (condenser lens, for example) 39, which collects the light radiated from the light source 38. The reticle 30D is based on any of the reticles $30A_1$ to $30A_3$ described as the first embodiment, any of the reticles $30B_1$ to $30B_5$ described as the second embodiment, or the reticle 30C described as the third embodiment and further includes a reflector 37, which is provided on the pattern formation surface 31a of the optical member and has a reflection surface.

The reflector 37 is provided in the form of a recessed section 37a, which opens in a roughly central portion of the pattern formation surface 31a of the optical member 31, and part of the surface that forms the recessed section 37a forms a reflection surface 37c. The reflector 37 has the shape of an obliquely cut cylinder in appearance, and the reflection surface 37c projected on the pattern formation surface 31a has a circular shape. The reflector 37 is located at the intersection of a pattern line extending in the axis-x direction and a pattern line extending in the axis-y direction in the crosshair-shaped reticle pattern 32, that is, at the center of the disc-shaped reticle 30D and is formed on the side facing the pattern formation surface 31a of the optical member 31 (side facing object under observation).

The illumination light radiated from the light source 38 is collected by the light collector 39, and an image of the light source 38 is formed on the reflection surface 37c of the reflector 37. The image of the light source 38 is reflected off the reflection surface 37c in the direction of the optical axis of the rifle scope RS (axis-Z direction) and exits via the opposite surface 31b of the optical member. As described above, the ocular lens 4 is configured to allow visual recognition of an image of the reticle pattern 32 superimposed on the secondary image IM2. The reflection surface 37c is provided within the depth of focus of the ocular lens 4, whereby the observer can observe also the image of the light source 38 reflected off the reflection surface 37c. The observer can therefore visually recognize the image of the light source 38 in the form of a dot image at the center of the reticle pattern 32, that is, on the optical axis of the rifle scope RS.

The light collector 39 is configured to guide the illumination light radiated from the light source 38 to the reflector 37 (reflection surface 37c) from an angular position sandwiched between the two pattern lines, at least extensions of which intersect each other. In a case where the reticle pattern is crosshairs, the light collector 39 is configured to cause the light radiated from the light source 38 to be incident on the optical member 31 from an angular position inclining by about 45° with respect to the pattern line extending in the axis-x direction and the pattern line extending in the axis-y direction and further incident on the reflection surface 37c, as shown in FIG. 28. In other words, the optical axis of the illumination light from the light collector 39 toward the reflector 37 is set to incline by about 45° with respect to the axes x and y. Therefore, a situation in which the illumination light is incident on the protruding sections, the recessed sections, and other sections that form the pattern lines and interacts therewith will hardly occurs, whereby a reticle unit that can display a bright dot image (bright spot) and further display a high-contrast reticle pattern image can be provided.

The light collector 39 is configured to cause the illumination light radiated from the light source 38 to be incident on the side surface of the optical member 31 located between the pattern formation surface 31a and the opposite surface 31b and guide the illumination light to the reflector 37, as shown in FIG. 26. In the configuration example shown in FIG. 26, the optical axis of the illumination light intersects the optical axis Z of the rifle scope RS on the reflection surface 37c, but the reticle unit is so angularly configured that the optical axis of the illumination light does not intersect the optical axis Z of the rifle scope at right angles, but an extension of the optical axis of the illumination light intersects the pattern formation surface 31a. According to the configuration described above, the situation in which the illumination light is incident on the protruding sections, the recessed sections, and other sections can be avoided, whereby a reticle unit that allows an increase in the luminance of the dot image and a further increase in the contrast of the image of the reticle pattern can be provided.

The reticle 30D according to the fifth embodiment can also be formed by die-based forming, as in the description of the fourth embodiment. Examples of the die-based forming may include glass molding, injection molding using a resin material, and cast molding. Examples of the resin material may include a methacrylic resin (PMMA) also referred to as an acrylic resin, polycarbonate (PC), and a cyclic olefin polymer (COP) as well as the specific materials having been already described. Performing the die-based forming allows a high-precision reticle to be readily produced. Further, the resin-material-based forming allows a reticle to be produced with high productivity at low cost.

Further, in the reticle 30D, the reflector 37, which reflects the illumination light, is integrally formed in addition to the reticle pattern 32 in the forming process. Therefore, a focus plate having a complex structure in which a reticle section which is made of glass and on which a reticle pattern is formed is combined with an optical member which is made of resin and on which a reflector is formed requires manufacture and assembly of the reticle section and the reflector in related art, but the reticle 30D having the present configuration allows integral formation of the focus plate in a single forming process. A reticle having the pointer function, which has been relatively expensive in related art, can be provided at inexpensive price.

The configuration in which the protruding sections 33, the recessed sections 34, and other sections are provided only on the pattern formation surface 31a has been presented by way of example. The protruding sections 33 and/or the recessed sections 34 may instead be formed on the pattern formation surface 31a and the opposite surface 31b. Further, the configuration in which the inclination angles of the inclining surfaces 140 of the protruding ridges 133, the V grooves 134, and other portions are so set that the inclination angles of the two inclining surfaces 140, 140 that form each of the protruding ridges 133 are equal to each other has been presented by way of example. The inclination angles of the two inclining surfaces 140, 140 may differ from each other in accordance, for example, with the position where the pattern lines are formed with respect to the optical axis Z of the rifle scope RS. Further, one of the surfaces that form each of the protruding ridges 133, the V grooves 134, and other portions may be an inclining surface, and the other may be a surface parallel to the optical axis Z.

The form in which the light incident on the protruding ridges 133, the V grooves 134, and other portions is refracted and therefore deflected has been presented by way of example. The light incident on the protruding ridges 133, the V grooves 134, and other portions may instead be reflected and therefore deflected, or the combination of reflection and refraction may be used to deflect the light.

The above embodiments have been described with reference to the rifle scope RS as an optical apparatus including any of the reticles 30 (30A, 30B, 30C, and 30D). A rifle scope is an example of the optical apparatus using any of the reticles 30 according to the embodiments, and the present invention is applicable to a variety of optical apparatuses, such as a field scope, binoculars, and other telescopes, a range finder, a transit, and other surveying apparatuses, an eyeball inspection apparatus, a fiber scope, and other medical scopes, and a variety of microscopes.

REFERENCE SIGNS LIST

RS rifle scope (optical apparatus)
Z Optical axis of rifle scope (optical axis of observation optical path)
1 Objective lens
3 Reticle unit
4 Ocular lens
30 Reticle
30A Reticle according to first embodiment ($30A_1$, $30A_2$, and $30A_3$)
30B Reticle according to second embodiment ($30B_1$, $30B_2$, $30B_3$, $30B_4$, and $30B_5$)
30C Reticle according to third embodiment
30D Reticle of reticle unit according to fifth embodiment
31 Optical member
31a Pattern formation surface (one surface of optical member)
31b Opposite surface (other surface of optical member)
32 Reticle pattern
32a Thin linear pattern (linear partial pattern)
32b Thick linear pattern (linear partial pattern)
32c Ring-shaped pattern (curved partial pattern)
32d Cross pattern (linear partial pattern)
32e Letter pattern
33a, 33b Protruding section
34a, 34b Recessed section
35a, 35b Protruding/recessed section
37 Reflector
37c Reflection surface
38 Light source
39 Light collector 133 Protruding ridge
134 V groove
135a, 135b, 135c, 135d Conical structural element
136 Quadrangular pyramidal structural element
140 Inclining surface
141 Bottom edge of conical structural element
143 Bottom edge of quadrangular pyramidal structural element
145 Light transmissive surface

The invention claimed is:

1. A reticle disposed in an observation optical path between an objective lens and an ocular lens in a position of an image formed by the objective lens, the reticle having a pattern formed thereon, the pattern being configured to aid in targeting an object under observation when an observer visually recognizes the object under observation via the ocular lens,
wherein the pattern includes a protruding section and/or a recessed section provided on at least one surface of a plate-shaped optical member,
the protruding section and/or the recessed section are each formed of a plurality of structural elements, and
the structural elements each have an inclining surface inclining with respect to an optical axis of the observation optical path,
wherein an inclination angle of the inclining surfaces with respect to the optical axis is set at an angle that causes light incident via the objective lens to be deflected to exit out of the observation optical path so as to not reach the observer through the ocular lens, and
wherein the protruding section and/or the recessed section are each formed of the plurality of structural elements having the inclining surface different from one another in terms of height.

2. The reticle according to claim 1,
wherein the inclining surfaces are each a refraction surface that refracts the light incident via the objective lens, and
the light incident via the objective lens is so refracted as to exit out of the observation optical path to allow the observer to visually recognize the pattern as a dark pattern image superimposed on an image of the object under observation.

3. The reticle according to claim 1,
wherein the pattern includes the protruding section,
the structural elements of the protruding section are each a protruding ridge having two of the inclining surfaces that face each other with an extending ridge line, and
the protruding section is formed of a plurality of protruding ridges having the ridge line extending in a lengthwise direction of a line that forms the pattern in parallel to a widthwise direction of the line.

4. The reticle according to claim 3,
wherein the pattern has linear partial patterns having different widths, and
the linear partial patterns having different widths are formed of the protruding ridges provided in rows, the number of which is determined in accordance with a linewidth of each of the linear partial patterns.

5. The reticle according to claim 1,
wherein the pattern includes the recessed section,
the structural elements of the recessed section are each a groove having two of the inclining surfaces that face each other with an extending trough line, and
the recessed section is formed of a plurality of grooves having the trough line extending in a lengthwise direction of a line that forms the pattern in parallel to a widthwise direction of the line.

6. The reticle according to claim 1,
wherein the pattern includes the protruding section,
the structural elements of the protruding section include structural elements having pyramidal shapes or conical shapes formed to protrude from the at least one surface,
the inclining surfaces of the structural elements having pyramidal surfaces or conical surfaces, and
the protruding section is a cluster of the plurality of structural elements.

7. The reticle according to claim 6,
wherein the pattern includes a plurality of partial patterns, and
at least one partial pattern includes a protruding section that is formed of a plurality of polygonal-pyramidal structural elements that are densely formed.

8. The reticle according to claim 7,
wherein the plurality of partial patterns includes a curved partial pattern, and
the curved partial pattern includes a protruding section that is formed of a plurality of conical structural elements that are densely formed.

9. The reticle according to claim 8,
wherein the curved partial pattern is a ring-shaped pattern formed by arranging the plurality of conical structural elements in a concentric manner, and
intervals at which the conical structural elements located along an outer circumferential concentric circle of the concentric circles are arranged are smaller than intervals at which the conical structural elements located along an inner circumferential concentric circle of the concentric circles are arranged.

10. The reticle according to claim 8, wherein the plurality of conical structural elements that form the curved partial pattern are so arranged that outer circular edges of bottoms of adjacent conical structural elements overlap with each other.

11. The reticle according to claim 1,
wherein the pattern includes the recessed section,
the structural elements of the recessed section are each having a pyramidal shape formed to be recessed from the at least one surface,
the inclining surfaces are each a pyramidal surface, and
the recessed section is a cluster of the plurality of structural elements.

12. A field scope comprising:
the reticle according claim 1;
the objective lens that forms an image of the object under observation; and
the ocular lens for observing the image of the object under observation formed by the objective lens.

13. An optical apparatus comprising:
the reticle according claim 1;
the objective lens that forms an image of the object under observation; and
the ocular lens for observing the image of an object under observation formed by the objective lens.

14. A reticle disposed in an observation optical path between an objective lens and an ocular lens in a position of an image formed by the objective lens, the reticle having a pattern formed thereon, the pattern being configured to aid in targeting an object under observation when an observer visually recognizes the object under observation via the ocular lens, wherein the pattern includes a protruding section provided on at least one surface of a plate-shaped optical member, the protruding section is formed of a plurality of structural elements, the structural elements each have an inclining surface inclining with respect to an optical axis of the observation optical path, an inclination angle of the inclining surfaces with respect to the optical axis is set at an angle that causes light incident via the objective lens to be deflected to exit out of the observation optical path, wherein the structural elements of the protruding section are each a protruding ridge having two of the inclining surfaces that face each other with an extending ridge line, and wherein the protruding section is formed of a plurality of protruding ridges having the ridge line extending in a lengthwise direction of a line that forms the pattern in parallel to a widthwise direction of the line.

15. The reticle according to claim 14, wherein the inclining surfaces are each a refraction surface that refracts the light incident via the objective lens, and the light incident via the objective lens is so refracted as to exit out of the observation optical path to allow the observer to visually recognize the pattern as a dark pattern image superimposed on an image of the object under observation.

16. The reticle according to claim 14, wherein the pattern has linear partial patterns having different widths, and the linear partial patterns having different widths are formed of the protruding ridges provided in rows, the number of which is determined in accordance with a linewidth of each of the linear partial patterns.

17. The reticle according to claim 14, wherein the protruding section is formed of the plurality of structural elements having the inclining surfaces different from one another in terms of height.

18. A field scope comprising:

the reticle according claim 14;

the objective lens that forms an image of the object under observation; and the ocular lens for observing the image of the object under observation formed by the objective lens.

19. An optical apparatus comprising:

the reticle according claim 14;

the objective lens that forms an image of the object under observation; and the ocular lens for observing the image of the object under observation formed by the objective lens.

20. A reticle disposed in an observation optical path between an objective lens and an ocular lens in a position of an image formed by the objective lens, the reticle having a pattern formed thereon, the pattern being configured to aid in targeting an object under observation when an observer visually recognizes the object under observation via the ocular lens, wherein the pattern includes a protruding section provided on at least one surface of a plate-shaped optical member, the protruding section is formed of a plurality of structural elements, the structural elements each have an inclining surface inclining with respect to an optical axis of the observation optical path, an inclination angle of the inclining surfaces with respect to the optical axis is set at an angle that causes light incident via the objective lens to be deflected to exit out of the observation optical path, wherein the pattern includes a plurality of partial patterns, wherein a first partial pattern includes a protruding section that is formed of a plurality of protruding ridges having two of the inclining surfaces that face each other with an extending ridge line, the ridge line extending in a lengthwise direction of a line that forms the partial pattern in parallel to a widthwise direction of the line, and wherein a second partial pattern includes a protruding section that is formed of a plurality of pyramidal structural elements.

21. The reticle according to claim 20, wherein the plurality of pyramidal structural elements include polygonal-pyramidal structural elements and conical structural elements.

22. A reticle disposed in an observation optical path between an objective lens and an ocular lens in a position of an image formed by the objective lens, the reticle having a pattern formed thereon, the pattern being configured to aid in targeting an object under observation when an observer visually recognizes the object under observation via the ocular lens, wherein the pattern includes a protruding section and/or a recessed section provided on at least one surface of a plate-shaped optical member, the protruding section and/or the recessed section are each formed of a plurality of structural elements, and the structural elements each have an inclining surface inclining with respect to an optical axis of the observation optical path, wherein an inclination angle of the inclining surfaces with respect to the optical axis is set at an angle that causes light incident via the objective lens to be deflected to exit out of the observation optical path, the structural elements of the protruding section including structural elements having pyramidal or conical shapes formed to protrude from the at least one surface, the structural elements of the recessed section including structural elements having pyramidal shapes formed to be recessed from the at least one surface, the inclining surfaces of the structural elements of the protruding section having the pyramidal surfaces or the conical surfaces, and the inclining surfaces of the structural elements of the recessed section having the pyramidal surfaces.

* * * * *